United States Patent
Hatakeyama

(10) Patent No.: US 8,922,699 B2
(45) Date of Patent: Dec. 30, 2014

(54) ZOOM LENS AND IMAGE PICKUP APPARATUS

(71) Applicant: Sony Corporation, Tokyo (JP)

(72) Inventor: Takeshi Hatakeyama, Chiba (JP)

(73) Assignee: Sony Corporation, Tokyo (JP)

( * ) Notice: Subject to any disclaimer, the term of this patent is extended or adjusted under 35 U.S.C. 154(b) by 153 days.

(21) Appl. No.: 13/763,168

(22) Filed: Feb. 8, 2013

(65) Prior Publication Data

US 2013/0229565 A1    Sep. 5, 2013

(30) Foreign Application Priority Data

Mar. 5, 2012  (JP) ................................. 2012-048159

(51) Int. Cl.
| | |
|---|---|
| *H04N 5/225* | (2006.01) |
| *G02B 13/16* | (2006.01) |
| *H04N 5/262* | (2006.01) |
| *G02B 9/60* | (2006.01) |
| *G02B 15/173* | (2006.01) |
| *G02B 15/14* | (2006.01) |

(52) U.S. Cl.
CPC ............. *G02B 15/14* (2013.01); *G02B 15/173* (2013.01); *G02B 9/60* (2013.01)
USPC ......................... 348/335; 348/240.3; 359/764

(58) Field of Classification Search
None
See application file for complete search history.

(56) References Cited

U.S. PATENT DOCUMENTS

| | | | | |
|---|---|---|---|---|
| 5,691,851 | A  * | 11/1997 | Nishio et al. .................. | 359/683 |
| 8,432,464 | B2 * | 4/2013 | Katayose et al. .......... | 348/240.3 |
| 8,526,116 | B2 * | 9/2013 | Katayose et al. ............. | 359/683 |
| 8,531,784 | B2 * | 9/2013 | Hashimoto .................... | 359/738 |

FOREIGN PATENT DOCUMENTS

| | | |
|---|---|---|
| JP | 2010-185942 | 8/2010 |
| JP | 2011-247962 | 12/2011 |

* cited by examiner

*Primary Examiner* — Justin P Misleh
(74) *Attorney, Agent, or Firm* — Rader, Fishman & Grauer PLLC

(57) ABSTRACT

A zoom lens includes a fixed first lens group having a positive refracting power, a second lens group having a negative refracting power and movable along an optical axis, a fixed third lens group having a positive refracting power, a fourth lens group having a negative refracting power and movable along the optical axis, and a fixed fifth lens group, disposed in order from the object side to the image side. The following expressions are satisfied:

$$0.5 < f1/(fw \cdot ft)^{1/2} < 1.8$$

$$-0.4 < f3/f5 < 0.4$$

where f1, fw, ft, f3 and f5 are focal lengths of the first lens group, the entire lens system in a wide angle end state, the entire lens system in a telephoto end state, the third lens group and the fifth lens group, respectively.

6 Claims, 17 Drawing Sheets

ZOOM LENS AND IMAGE PICKUP APPARATUS

BACKGROUND

The present technology relates to a zoom lens and an image pickup apparatus. More particularly, the present technology relates to a technical field of a zoom lens which has a zoom ratio of approximately 3 to 8 times and an angle of view at a wide angle end of approximately 55° to 80° and is suitable for use with a digital video camera, a digital still camera and so forth, and an image pickup apparatus which includes the zoom lens.

In recent years, along with the popularization of an image pickup apparatus which uses a solid-state image pickup device such as a digital video camera or a digital still camera, still higher picture quality is demanded. Especially, in order to obtain a rich gradation representation or a representation which takes advantage of blurring in a picked up image, a bright lens compatible with a still greater image pickup device is demanded.

In general, the lens size increases by increase of the image circle or the aperture of the lens. However, also miniaturization of the lens with the portability taken into consideration is demanded strongly.

Meanwhile, in order to achieve compatibility between high quality and quietness upon zooming or focusing in moving picture image pickup, a lens is demanded which includes a zooming mechanism or a focusing mechanism of high quality by which image shaking or image skipping is less likely to be caused during image pickup.

In general, if the number of lens groups which move in a direction of an optical axis upon zooming or upon focusing is reduced to reduce the weight, then the compatibility between high quality and quietness upon zooming or upon focusing is facilitated.

A zoom lens suitable for use with a camera which uses an image pickup device of the APS-C size is known and disclosed in Japanese Patent Laid-Open No. 2011-247962 (hereinafter referred to as Patent Document 1). With the zoom lens, sufficient reduction in weight of a focusing group is achieved.

The zoom lens disclosed in Patent Document 1 includes a first lens group having a positive refracting power, a second lens group having a negative refracting power, a third lens group having a positive refracting power, a fourth lens group having a negative refracting power and a fifth lens group, disposed in order from the object side.

Another zoom lens by which compatibility between high quality and quietness upon zooming or upon focusing can be achieved readily is disclosed in Japanese Patent Laid-Open No. 2010-185942 (hereinafter referred to as Patent Document 2). The zoom lens is of the inner zoom type and the inner focus type in which the overall length of the optical system does not vary upon zooming and upon focusing.

The zoom lens disclosed in Patent Document 2 includes a first lens group having a positive refracting power, a second lens group having a negative refracting power, a third lens group having a positive refracting power, a fourth lens group having a positive refracting power and a fifth lens group having a positive refracting power, disposed in order from the object side.

SUMMARY

However, the zoom lens disclosed in Patent Document 1 is configured such that, upon zooming, all lens groups including the first lens group which has the greatest weight individually move to the object side along the optical axis. Therefore, a complicated mechanical structure and a driving mechanism having high driving force are used in the zooming mechanism.

If the mechanical structure is complicated, then it becomes difficult to suppress relative eccentricity between the lens groups which move in a direction of the optical axis. Therefore, it becomes difficult to carry out zooming of high quality which is less likely to suffer from image shaking or image skipping during image pickup, and it becomes difficult to assure high picture quality.

Further, if the driving force of the driving mechanism increases, noise generated from the driving mechanism increases, resulting in difficulty to assure quietness.

Accordingly, with the zoom lens disclosed in Patent Document 1, compatibility between high quality and quietness upon zooming during image pickup of moving pictures is difficult.

Meanwhile, the zoom lens disclosed in Patent Document 2 is configured such that it includes the first lens group having a positive refracting power, second lens group having a negative refracting power, third lens group having a positive refracting power, fourth lens group having a positive refracting power and fifth lens group having a positive refracting power, disposed in order from the object side. Upon zooming, the second lens group and the fourth lens group are individually moved in the direction of the optical axis, and upon focusing, the fourth lens group is moved in the direction of the optical axis.

Accordingly, in the case where it is tried to form the zoom lens so as to be compatible with an image pickup device of a large size, the size of the lens groups becomes great. Also the driving mechanism for moving the lens groups is increased in size. Therefore, the portability of the zoom lens is deteriorated by the increase in size and weight of the zoom lens.

Therefore, it is desirable to provide a zoom lens and an image pickup apparatus which solves the problems described above and can assure compatibility of high picture quality and quietness upon zooming and upon focusing and a good image formation performance over an overall zooming range while reduction in size and weight is assured.

According to one mode of the present technology, there is provided a zoom lens including a first lens group, a second lens group, a third lens group, a fourth lens group, and a fifth lens group. The first lens group has a positive refracting power and fixed in a direction of an optical axis. The second lens group has a negative refracting power and movable in the direction of the optical axis to carry out a zooming action. The third lens group has a positive refracting power and fixed in the direction of the optical axis. The fourth lens group has a negative refracting power and movable in the direction of the optical axis to correct a variation of an image forming position and correct a change of the image forming position caused by a change of an object distance. The fifth lens group is fixed in the direction of the optical axis. The first, second, third, fourth and fifth lenses are disposed in order from the object side to the image side. The zoom lens satisfies the following expressions (1) and (2)

$$0.5 < f1/(fw \cdot ft)^{1/2} < 1.8 \tag{1}$$

$$-0.4 < f3/f5 < 0.4 \tag{2}$$

where $f1$ is a focal length of the first lens group, $fw$ a focal length of the entire lens system in a wide angle end state, $ft$ a focal length of the entire lens system in a telephoto end state, $f3$ a focal length of the third lens group, and $f5$ a focal length of the fifth lens group.

Since the zoom lens is configured in such a manner as described above, the refracting powers of the first lens group, third lens group and fifth lens group are optimized.

Preferably, the zoom lens further satisfies the following expression (3)

$$0.6 < \beta 5 < 1.6 \quad (3)$$

where β5 is a lateral magnification of the fifth lens group.

Where the zoom lens satisfies the conditional expression (3), the lens can be miniaturized and the exit pupil distance is optimized.

Preferably, an aperture stop is disposed between the second lens group and the third lens group.

Where the aperture stop is disposed between the second lens group and the third lens group, the height of rays of light passing through the front lens and the rear lens is optimized.

Preferably, the third lens group is partly movable in a direction substantially perpendicular to the optical axis to allow correction of an image blur.

Where the third lens group is partly movable in a direction substantially perpendicular to the optical axis to allow correction of an image blur, since the third lens group is fixed in the direction of the optical axis, the layout of a driving mechanism for the third lens group is facilitated.

Preferably, the fifth lens group includes a positive lens and a negative lens disposed in order from the object side to the image side, and the zoom lens further satisfies the following expressions (4) and (5)

$$nd51 - nd52 < -0.35 \quad (4)$$

$$vd51 - vd52 > 15 \quad (5)$$

where nd51 is a refractive index of the positive lens of the fifth lens group on the d line, nd52 a refractive index of the negative lens of the fifth lens group on the d line, vd51 an Abbe number of the positive lens of the fifth lens group on the d line, and vd52 an Abbe number of the negative lens of the fifth lens group on the d line.

Where the fifth lens group is configured such that the positive lens and the negative lens are disposed in order from the object side to the image side and the zoom lens satisfies the conditional expressions (4) and (5), the relationship of the refractive indices and the Abbe numbers of the positive lens and the negative lens of the fifth lens group are optimized.

According to another mode of the present technology, there is provided also an image pickup apparatus including a zoom lens, and an image pickup device configured to convert an optical image formed by the zoom lens into an electric signal. The zoom lens includes a first lens group, a second lens group, a third lens group, a fourth lens group, and a fifth lens group. The first lens group has a positive refracting power and fixed in a direction of an optical axis. The second lens group has a negative refracting power and movable in the direction of the optical axis to carry out a zooming action. The third lens group has a positive refracting power and fixed in the direction of the optical axis. The fourth lens group has a negative refracting power and movable in the direction of the optical axis to correct a variation of an image forming position and correct a change of the image forming position caused by a change of an object distance. The fifth lens group is fixed in the direction of the optical axis. The first, second, third, fourth and fifth lenses are disposed in order from the object side to the image side. The zoom lens satisfies the following expressions (1) and (2)

$$0.5 < f1/(fw \cdot ft)^{1/2} < 1.8 \quad (1)$$

$$-0.4 < f3/f5 < 0.4 \quad (2)$$

where f1 is a focal length of the first lens group, fw a focal length of the entire lens system in a wide angle end state, ft a focal length of the entire lens system in a telephoto end state, f3 a focal length of the third lens group, and f5 a focal length of the fifth lens group.

Since the image pickup apparatus is configured in such a manner as described above, the refracting powers of the first lens group, third lens group and fifth lens group are optimized.

With the zoom lens and the image pickup apparatus of the present technology, while reduction in size and weight is assured, the compatibility of high picture quality and quietness upon zooming or upon focusing can be achieved and a good imaging performance over the overall zooming region can be assured.

DETAILED DESCRIPTION OF THE PREFERRED EMBODIMENTS

Figure 1:
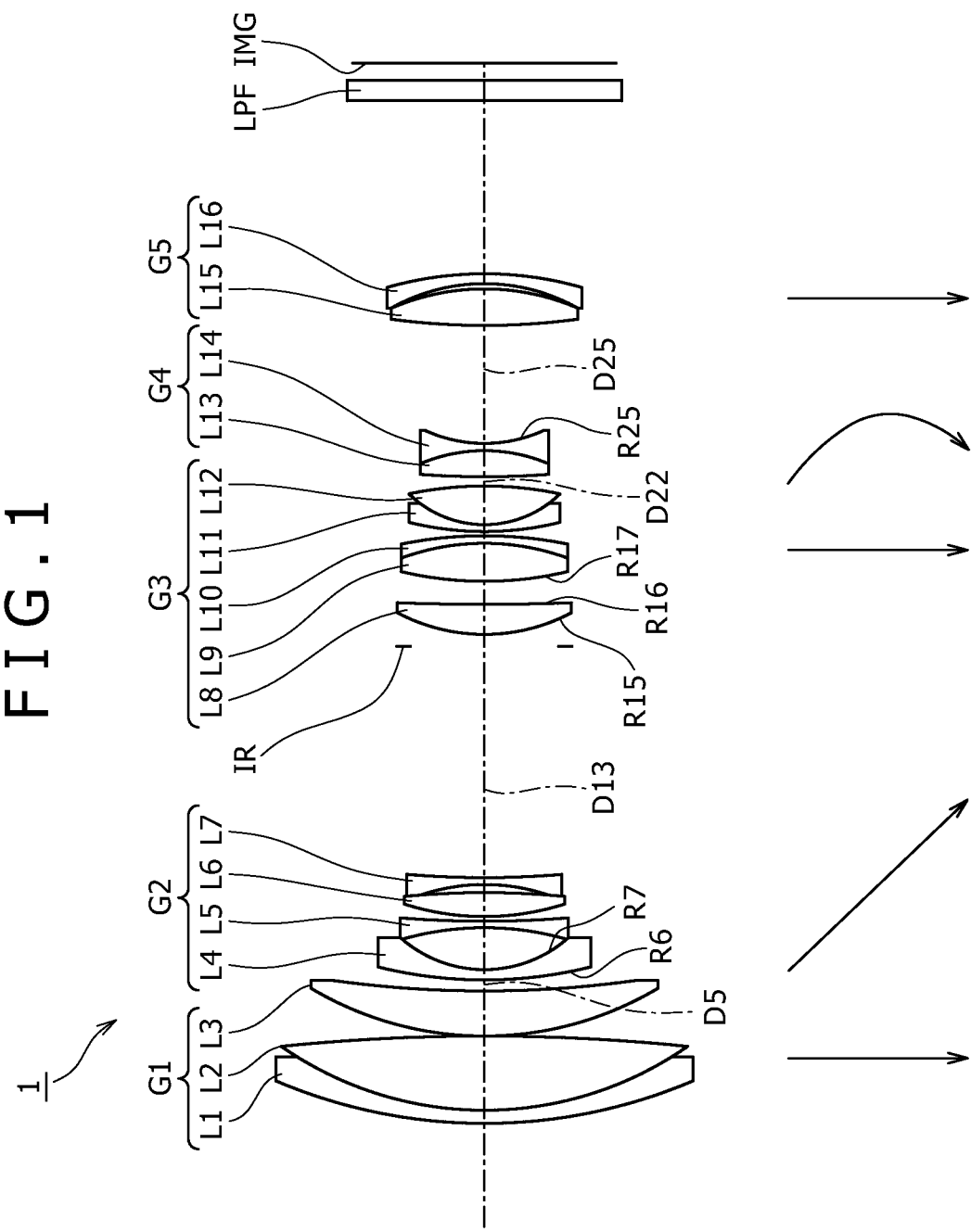
FIG. 1 is a schematic view showing a lens configuration of a zoom lens according to a first embodiment of the present technology.

In the following, a zoom lens and an image pickup apparatus according to preferred embodiments of the present technology are described.

Configuration of the Zoom Lens

The zoom lens of the present technology includes a first lens group, a second lens group, a third lens group, a fourth lens group, and a fifth lens group. The first lens group has a positive refracting power and fixed in a direction of an optical axis. The second lens group has a negative refracting power and movable in the direction of the optical axis to carry out a zooming action. The third lens group has a positive refracting power and fixed in the direction of the optical axis. The fourth lens group has a negative refracting power and movable in the direction of the optical axis to correct a variation of an image forming position and correct a change of the image forming position caused by a change of an object distance. The fifth lens group is fixed in the direction of the optical axis. The first, second, third, fourth and fifth lenses are disposed in order from the object side to the image side. The zoom lens satisfies the following expression (1) and (2):

$$0.5 < f1/(fw \cdot ft)^{1/2} < 1.8 \qquad (1)$$

$$-0.4 < f3/f5 < 0.4 \qquad (2)$$

where $f1$ is a focal length of the first lens group; $fw$ a focal length of the entire lens system in a wide angle end state; $ft$ a focal length of the entire lens system in a telephoto end state; $f3$ a focal length of the third lens group; and $f5$ a focal length of the fifth lens group.

The conditional expression (1) defines an appropriate magnitude of the focal length of the first lens group with respect to the focal length of the entire lens system.

If the lower limit value of the conditional expression (1) is exceeded downwardly, then the positive refracting power of the first lens group becomes excessively high, and therefore, the spherical aberration in the telephoto end state cannot be cancelled sufficiently.

On the contrary, if the upper limit value of the conditional expression (1) is exceeded upwardly, then the refracting power of the first lens group becomes excessively low, and therefore, the lens comes to have a large size. Further, since also the second lens group and the fourth lens group which move in the direction of the optical axis upon zooming and upon focusing come to have a large size, also the driving mechanism for them comes to have a large size.

The conditional expression (2) defines an appropriate magnitude of the focal length of the third lens group with respect to the focal length of the fifth lens group.

If the lower limit value of the conditional expression (2) is exceeded downwardly, then the negative refracting power of the fifth lens group becomes excessively high. Therefore, the astigmatism and the field curvature cannot be corrected sufficiently.

On the contrary, if the upper limit value of the conditional expression (2) is exceeded upwardly, then the positive refracting power of the third lens group becomes excessively low or the positive refracting power of the fifth lens group becomes excessively high. Consequently, the lenses come to have a large size. Further, since also the second lens group and the fourth lens group which move in the direction of the optical axis upon zooming and upon focusing come to have a large size, also the driving mechanism for them comes to have a large size.

Accordingly, if the zoom lens satisfies the conditional expressions (1) and (2), then a good image forming performance can be obtained over the overall range of zooming while miniaturization of the zoom lens is assured.

Further, also the second lens group and the fourth lens group which move in the direction of the optical axis upon zooming and upon focusing can be reduced in size and weight. Therefore, both of high picture quality and quietness upon zooming and upon focusing in image pickup of moving pictures can be facilitated.

It is to be noted that, if the lower limit value and the upper limit value in the conditional expression (1) are set to 0.8 and 1.5, respectively, then the effects described above can be enhanced.

Further, if the lower limit value and the upper limit value of the conditional expression (2) are set to −0.2 and 0.2, respectively, then the effects described above can be enhanced furthermore.

According to an embodiment of the present technology, preferably the zoom lens can be configured such that the zoom lens further satisfies the following expression (3):

$$0.6 < \beta 5 < 1.6 \qquad (3)$$

where $\beta 5$ is a lateral magnification of the fifth lens group.

The conditional expression (3) defines a lateral magnification of the fifth lens group.

If the lower limit value of the conditional expression (3) is exceeded downwardly, then the lens size comes to increase.

On the contrary, if the upper limit value of the conditional expression (3) is exceeded upwardly, then the exit pupil distance becomes excessively short. This is not preferable to an image pickup apparatus which uses a solid-state image pickup device.

Accordingly, if the zoom lens satisfies the conditional expression (3), then an appropriate exit pupil distance can be assured and besides miniaturization can be anticipated.

It is to be noted that, if the lower limit value and the upper limit value in the conditional expression (3) are set to 0.8 and 1.4, respectively, then the effects described can be enhanced further.

According to the embodiment of the present technology, preferably the zoom lens can be configured such that an aperture stop is disposed between the second lens group and the third lens group.

When off-axis rays pass a lens group disposed far away from the aperture stop, the more distance from the aperture stop increases, the more a ray height from the optical axis and a generation of an off-axis aberration increase.

Accordingly, by disposing the aperture stop between the second lens group and the third lens group, the diameter of the front lens and the diameter of the rear lens can be reduced in a well-balanced state.

Further, since also the second lens group and the fourth lens group which move in the direction of the optical axis upon zooming or upon focusing can be reduced in size and weight, both of high picture quality and quietness upon zooming and upon focusing in image pickup of moving pictures can be facilitated.

According to the embodiment of the present technology, preferably the zoom lens can be configured such that the third lens group is partly movable in a direction substantially perpendicular to the optical axis to allow correction of an image blur.

Since the third lens group is fixed in the direction of the optical axis, arrangement of the components including the driving mechanism is facilitated.

Further, since the third lens group is disposed in the proximity of the aperture stop, it is easy to increase the shake correction coefficient which is a ratio of a shift amount of an image to a moving amount of a vibration reduction lens group for canceling an image shake, and also an aberration fluctuation upon cancellation of a camera shake can be suppressed readily. Accordingly, the moving amount of the vibration reduction lens group can be reduced and also the size of the driving mechanism for the vibration reduction lens group can be configured in a reduced size.

It is to be noted that, in order to suppress a fluctuation of the comatic aberration upon lens shifting, preferably one face of the vibration reduction lens group is formed as an aspheric face.

Further, in order to suppress the fluctuation of the chromatic aberration upon lens shifting, preferably the vibration reduction lens group is configured from a lens of a low variance having a positive refracting power or a lens which is a combination of a lens of a low variance having a high positive refracting power and another lens of a high variance having a low negative refracting power and suppresses a chromatic aberration.

According to the embodiment of the present technology, preferably the zoom lens can be configured such that the fifth lens group includes a positive lens and a negative lens disposed in order from the object side to the image side, and the zoom lens further satisfies the following expressions (4) and (5):

$$nd51 - nd52 < -0.35 \quad (4)$$

$$vd51 - vd52 > 15 \quad (5)$$

where nd51 is a refractive index of the positive lens of the fifth lens group on the d line; nd52 a refractive index of the negative lens of the fifth lens group on the d line; vd51 an Abbe number of the positive lens of the fifth lens group on the d line; and vd52 an Abbe number of the negative lens of the fifth lens group on the d line.

By configuring the fifth lens group in a two-lens configuration including a positive lens and a negative lens, the number of lenses of the zoom lens can be minimized to achieve reduction in size and weight.

The conditional expression (4) defines a relationship between the refractive indices of the positive lens and the negative lens of the fifth lens group.

If the upper limit value of the conditional expression (4) is exceeded upwardly, then the astigmatism and the field curvature cannot be corrected sufficiently.

The conditional expression (5) defines a relationship between the Abbe numbers of the positive lens and the negative lens of the fifth lens group.

If the lower limit value of the conditional expression (5) is exceeded downwardly, then the chromatic aberration of magnification cannot be corrected sufficiently.

Accordingly, by configuring the fifth lens in a two-lens configuration including the positive lens and the negative lens such that the conditional expression (4) and the conditional expression (5) are satisfied, it is possible to favorably correct the astigmatism, field curvature and chromatic aberration of magnification while miniaturization is assured. Consequently, a good image forming property can be achieved over an overall zooming region.

Further, by forming an aspheric face on a face on the object side of the positive lens of the fifth lens group, higher picture quality can be obtained.

It is to be noted that, if the upper limit value in the conditional expression (4) is set to −0.4, then the effects described can be further enhanced.

Further, if the lower limit value in the conditional expression (5) is set to 18, then the effects can be enhanced furthermore.

It is to be noted that, instead of changing the diameter of the aperture stop for adjusting a light amount, a neutral density (ND) filter or a liquid crystal dimming element can be preferably used for miniaturization and for preventing image degradation due to small aperture diffraction.

Further, by forming an aspheric face on the lens disposed on the most image side in the first lens group, still higher picture quality can be anticipated.

Working Examples of Numerical Values of the Zoom Lens

In the following, the zoom lens according to an embodiment of the present technology and numerical value examples wherein specific numerical values are applied to the embodiment are described with reference to the accompanying drawings and tables.

It is to be noted that several symbols used in the following description and tables have such meanings and so forth as given just below.

"Si" is the number of the ith face as counted from the object side to the image side; "R1" the radius of curvature of the ith face; "Di" the on-axis face distance between the ith face and the i+1th face, namely the thickness of the lens at the center or the air distance; "Ni" the refractive index of a material of a lens or the like beginning with the ith face with regard to the d line ($\lambda$=587.6 nm); and "vi" the Abbe number of the lens or the like beginning with the ith face at the d line.

As regards "Si," "ASP" represents that the face is an aspheric face, and as regards "Ri," "INFINITY" represents that the face is a flat face. Further, as regards "Di," "variable" represents that the face distance is a variable distance.

"κ" is the conic constant, and "A4," "A6," "A8" and "A10" are the fourth, sixth, eighth and tenth order aspheric coefficients.

"f" is the focal length; "Fno" the F number; and "ω" the half angle of view.

It is to be noted that, in the tables given below in which the aspheric constant is included, "E-n" represents an exponential notation to the base 10, namely "$10^{-n}$ (10 to the negative n-th)," and for example, "0.12345E-05" represents "$0.12345 \times 10^{-5}$ (10 to the negative fifth)."

The zoom lenses used in the embodiments include an aspheric lens face. Where "x" is the distance or sag amount in the direction of the optical axis from the vertex of the lens face; "y" the height, namely, the image height, in a direction perpendicular to the direction of the optical axis; "c" the paraxial radius of curvature at the vertex of the lens, namely, a reciprocal number to the radius of curvature; "κ" the conic constant; and "Ai" the ith order aspheric constant, the aspheric face shape is defined by the following expression 1:

$$x = \frac{y^2 \cdot c^2}{1 + \{1 - (1+\kappa) \cdot y^2 \cdot c^2\}^{1/2}} + \sum A i \cdot y^i \quad \text{[Expression 1]}$$

First Embodiment

FIG. 1 shows a lens configuration of a zoom lens 1 according to a first embodiment of the present technology.

The zoom lens 1 has a zoom ratio of 5.49 times.

The zoom lens 1 includes a first lens group G1 having a positive refracting power, a second lens group G2 having a negative refracting power, a third lens group G3 having a positive refracting power, a fourth lens group G4 having a negative refracting power, and a fifth lens group G5 having a positive refracting power. The first lens group G1, second lens group G2, third lens group G3, fourth lens group G4 and fifth lens group G5 are disposed in order from the object side to the image side.

The first lens group G1 is fixed in a direction of an optical axis, and the second lens group G2 is movable in the direction of the optical axis to carry out a zooming action. The third lens group G3 is fixed in the direction of the optical axis, and the fourth lens group G4 is movable in the direction of the optical axis to correct a variation of an image forming position and correct a change of the image forming position caused by a change of the object distance. The fifth lens group G5 is fixed in the direction of the optical axis.

The first lens group G1 is configured from a cemented lens of a negative lens L1 and a positive lens L2 cemented to each other, and a positive lens L3, disposed in order from the object side to the image side.

The second lens group G2 is configured from a negative lens L4, another negative lens L5, a positive lens L6 and a further negative lens L7 disposed in order from the object side to the image side.

The third lens group G3 is configured from a cemented lens of a positive lens L8, another positive lens L9 and a negative lens L10 cemented to each other, and another cemented lens of a negative lens L11 and a positive lens L12 cemented to each other. The lenses are disposed in order from the object side to the image side. The positive lens L9 and the negative lens L10 of the third lens group G3 are movable in a direction substantially perpendicular to the optical axis. Correction of an image blur is carried out by such movement of the positive lens L9 and the negative lens L10 in a direction perpendicular to the optical axis as just described.

The fourth lens group G4 is configured from a cemented lens of a positive lens L13 and a negative lens L14 cemented to each other.

The fifth lens group G5 is configured from a positive lens L15 and a negative lens L16 disposed in order from the object side to the image side.

Between the second lens group G2 and the third lens group G3, an aperture stop IR, namely, a stop surface S14, is disposed at a position in the proximity of the third lens group G3.

A low-pass filter LPF is disposed between the fifth lens group G5 and an image plane IMG.

Table 1 indicates lens data of the numerical value example 1 wherein particular numerical values are applied to the zoom lens 1 according to the first embodiment.

TABLE 1

| Si | Ri | Di | Ni | vi |
|---|---|---|---|---|
| 1 | 60.6212 | 1.400 | 1.92068 | 24.3 |
| 2 | 39.5066 | 8.019 | 1.49700 | 81.6 |
| 3 | −390.3955 | 0.300 | | |
| 4 | 37.1552 | 5.166 | 1.65160 | 58.4 |
| 5 | 170.6385 | Variable | | |
| 6 (ASP) | 63.3367 | 1.100 | 1.88202 | 37.2 |
| 7 (ASP) | 14.5368 | 4.630 | | |
| 8 | −31.4947 | 0.800 | 2.00100 | 29.1 |
| 9 | 128.0443 | 0.500 | | |
| 10 | 31.1609 | 2.569 | 2.10655 | 17.1 |
| 11 | −64.6368 | 0.858 | | |
| 12 | −24.6560 | 0.800 | 1.83481 | 42.7 |
| 13 | 81.9313 | Variable | | |
| 14 (Aperture stop) | Infinity | 1.200 | | |
| 15 (ASP) | 19.9195 | 3.414 | 1.59201 | 67.0 |
| 16 (ASP) | −422.5284 | 2.500 | | |
| 17 (ASP) | 39.2872 | 4.273 | 1.61881 | 63.9 |
| 18 | −27.1333 | 0.800 | 1.78472 | 25.7 |
| 19 | −54.2666 | 0.500 | | |
| 20 | 33.1274 | 0.800 | 1.90366 | 31.3 |
| 21 | 12.1275 | 4.274 | 1.51742 | 52.2 |
| 22 | −44.2412 | Variable | | |
| 23 | 85.3683 | 2.950 | 1.80518 | 25.5 |
| 24 | −17.5672 | 0.800 | 1.85135 | 40.1 |
| 25 (ASP) | 18.0949 | Variable | | |
| 26 | 64.3181 | 4.011 | 1.53172 | 48.8 |
| 27 | −25.7154 | 0.600 | | |
| 28 | −20.3410 | 1.100 | 2.00100 | 29.1 |
| 29 | −37.7531 | 19.457 | | |
| 30 | Infinity | 2.000 | 1.51680 | 64.2 |
| 31 | Infinity | 2.000 | | |

In the zoom lens 1, the opposite faces of the negative lens L4 of the second lens group G2, namely, the sixth and seventh faces, the opposite faces of the positive lens L8 of the third lens group G3, namely, the 15th and 16th faces, the object side face of the positive lens L9 of the third lens group G3, namely, the 17th face, and the image side face of the negative lens L14 of the fourth lens group G4, namely, the 25th face, are formed as aspheric faces.

The fourth, sixth, eighth and tenth order aspheric coefficients A4, A6, A8 and A10 of the aspheric faces in the numerical value example 1 are indicated in Table 2 below together with the conic constant κ.

TABLE 2

| Si | K | A4 | A6 | A8 | A10 |
|---|---|---|---|---|---|
| 6 | 0.0000 | 7.51649E−06 | 1.88189E−08 | −3.35896E−10 | 1.70812E−12 |
| 7 | 0.0000 | 9.34183E−06 | 6.78785E−08 | 0.00000E+00 | 0.00000E+00 |
| 15 | −1.8468 | 1.99795E−05 | 2.64406E−08 | 1.20961E−10 | −9.35430E−14 |
| 16 | 0.0000 | 2.34722E−05 | 2.73665E−08 | 0.00000E+00 | 0.00000E+00 |
| 17 | 0.0000 | −1.08635E−05 | 1.43805E−08 | −1.98631E−10 | 7.77164E−13 |
| 25 | 0.0000 | −1.22922E−05 | −7.24901E−08 | 4.90204E−10 | −6.74339E−12 |

In the zoom lens 1, upon zooming between the wide angle end state and the telephoto end state, the face distance D5 between the first lens group G1 and the second lens group G2, the face distance D13 between the second lens group G2 and the aperture stop IR, the face distance D22 between the third lens group G3 and the fourth lens group G4 and the face distance D25 between the fourth lens group G4 and the fifth lens group G5 vary.

The variable distances in the wide angle end state, an intermediate focal length state and the telephoto end state among the face distances in the numerical value example 1 are indicated in Table 3 below together with the F number Fno and the half angle ω of view.

TABLE 3

|  | Wide angle end | Intermediate length | Telephoto end |
|---|---|---|---|
| f | 24.73 | 57.95 | 135.84 |
| Fno | 3.56 | 3.94 | 4.09 |
| ω (Degree) | 30.08 | 12.83 | 5.51 |
| D5 | 1.200 | 14.459 | 24.513 |
| D13 | 25.813 | 12.554 | 2.500 |
| D22 | 0.995 | 5.844 | 4.921 |
| D25 | 13.169 | 8.321 | 9.244 |

Figure 2:
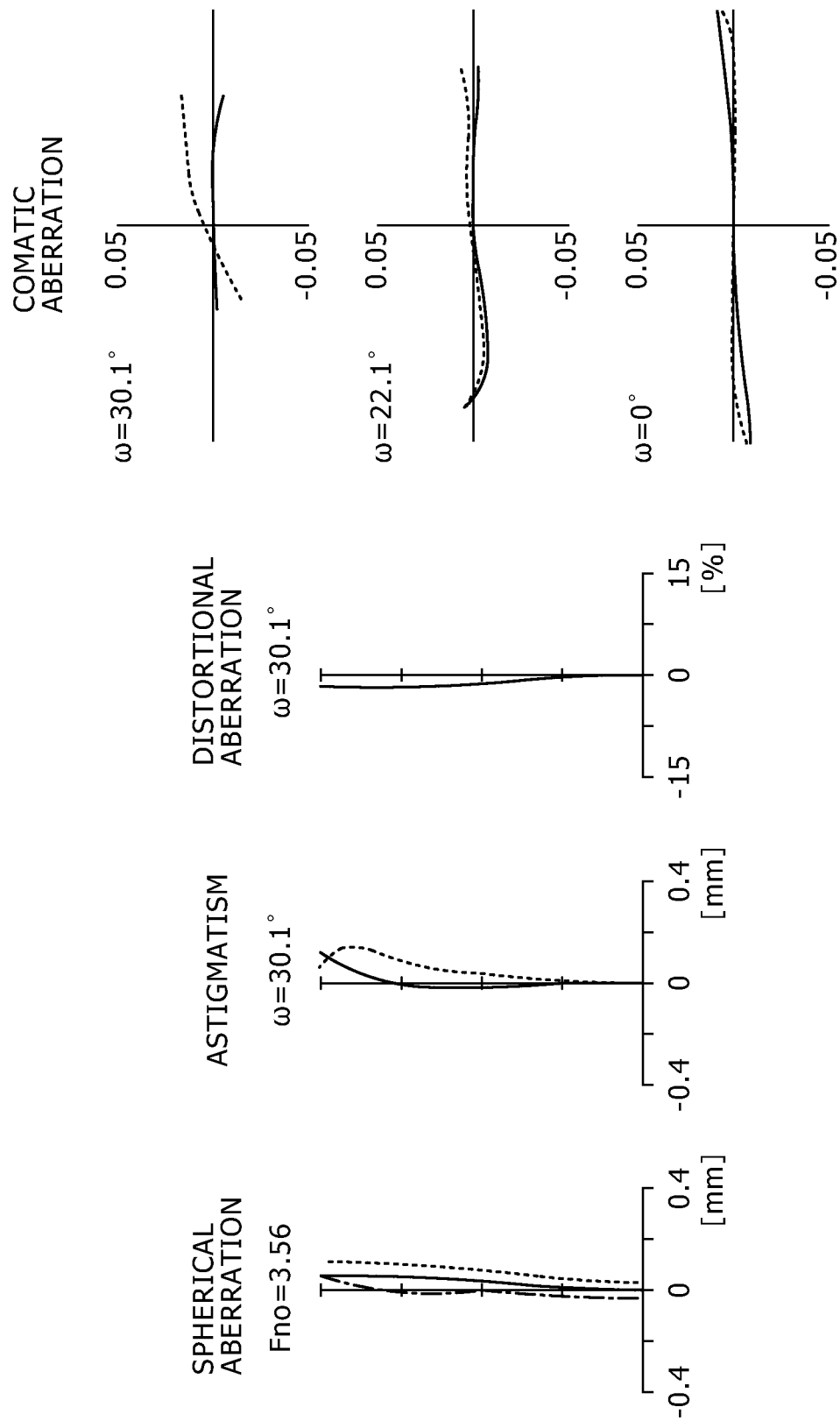
FIG. 2 is a diagrammatic view illustrating a spherical aberration, an astigmatism, a distortional aberration and comatic aberrations in a wide angle end state of the zoom lens of FIG. 1 according to a numerical value example wherein particular numerical values are applied to the zoom lens together with FIGS. 3 and 4.
Figure 3:
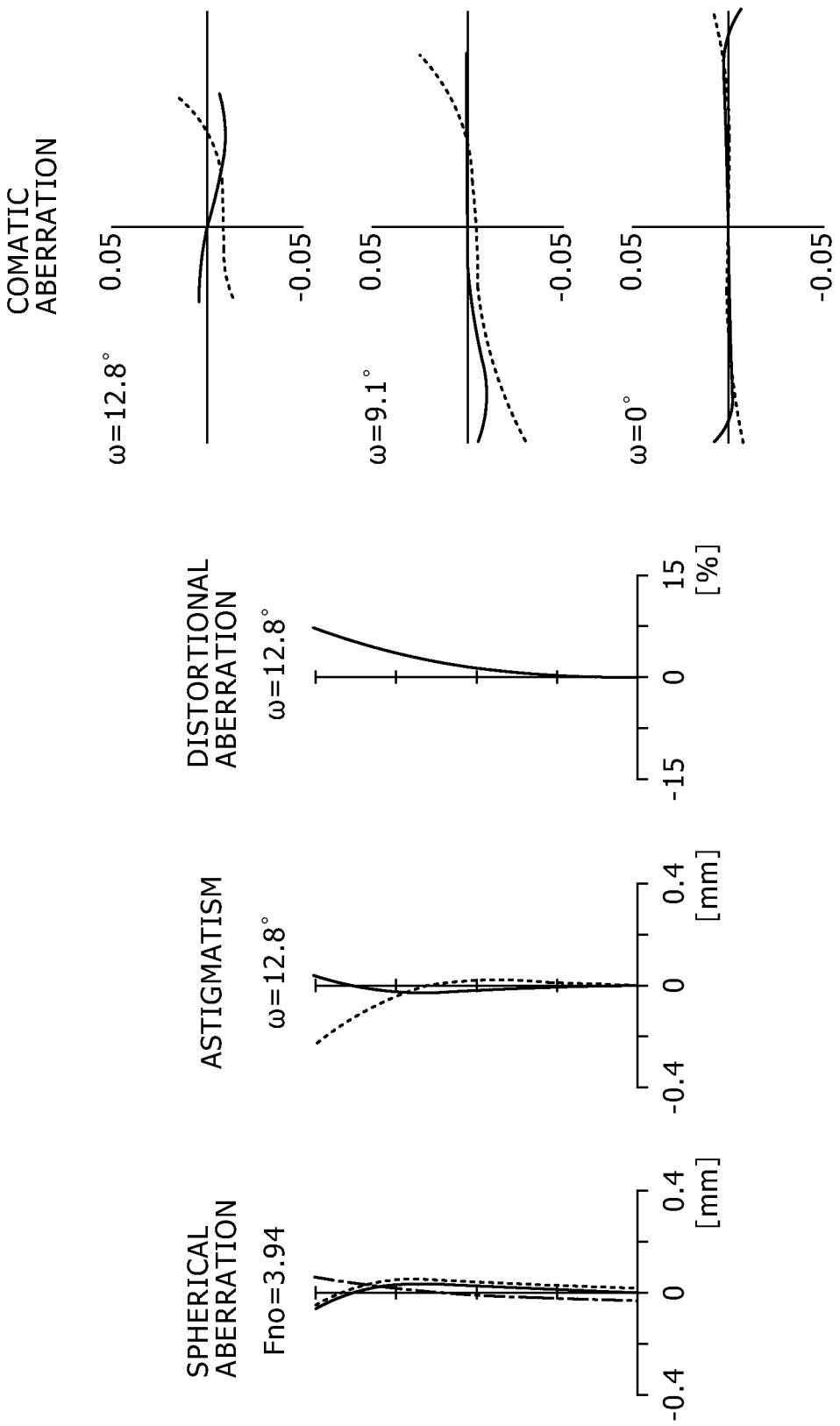
FIG. 3 is a similar view but illustrating a spherical aberration, an astigmatism, a distortional aberration and comatic aberrations of the zoom lens of FIG. 1 in an intermediate focal length state.
Figure 4:
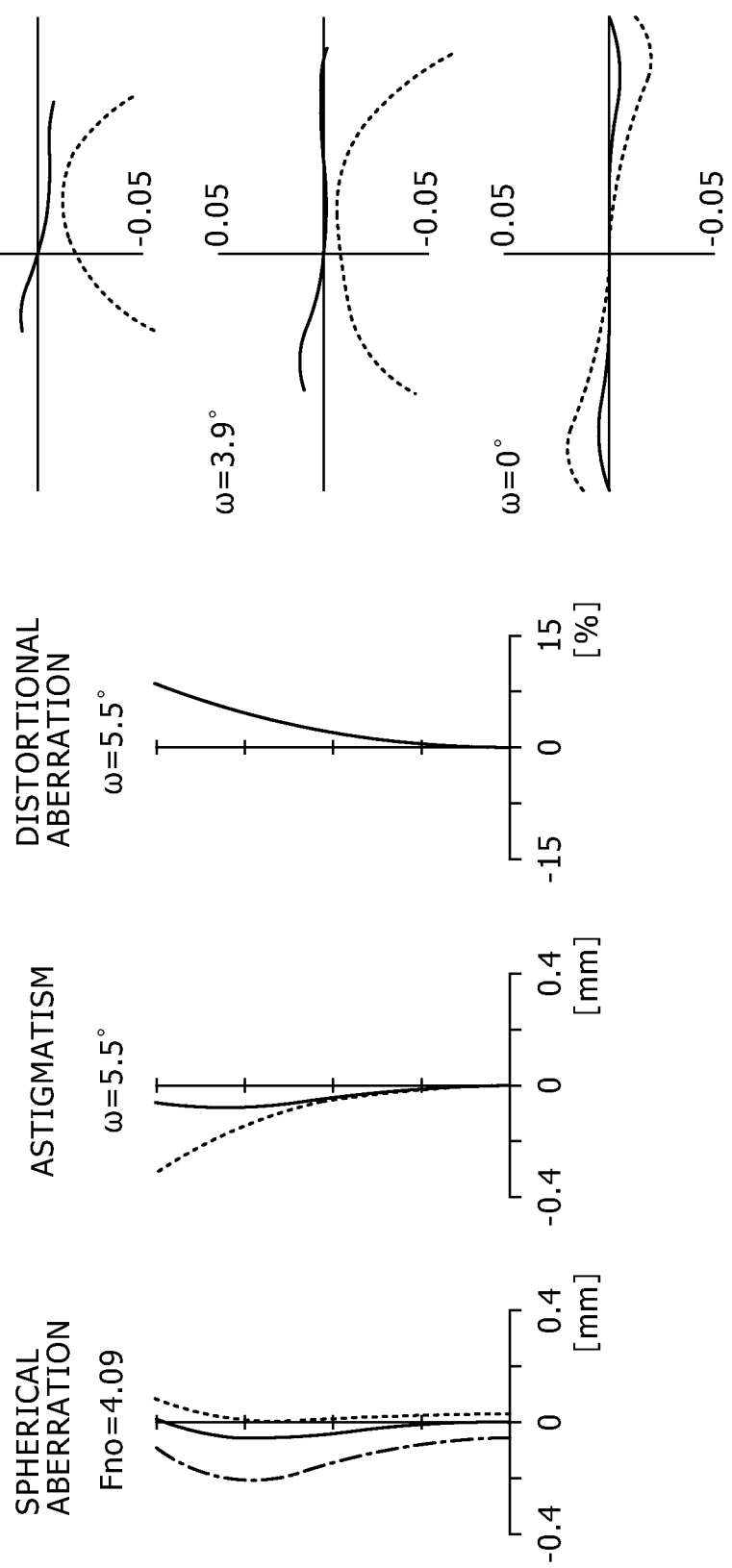
FIG. 4 is a similar view but illustrating a spherical aberration, an astigmatism, a distortional aberration and comatic aberrations of the zoom lens of FIG. 1 in a telephoto end state.

FIGS. 2 to 4 illustrate various aberrations in the numerical value example 1. Particularly, FIG. 2 illustrates the aberrations in an infinitely remotely focused state in the wide angle state; FIG. 3 illustrates the aberrations in an infinitely remotely focused state in an intermediate focal length state; and FIG. 4 illustrates the aberrations in an infinitely remotely focused state in the telephoto end state.

In the spherical aberration diagrams of FIGS. 2 to 4, the axis of ordinate indicates the ratio of the spherical aberration to the open F value and the axis of abscissa indicates the defocus amount. Further, a solid line curve indicates values on the d line (wavelength: 587.56 nm); a broken line curve indicates values on the C line (wavelength: 656.3 nm); and an alternate long and short dash line curve indicates values on the g line (wavelength: 435.8 nm). In the astigmatism diagrams, the axis of ordinate indicates the angle of view and the axis of abscissa indicates the defocus amount. Further, a solid line curve indicates values on the sagittal image plane of the d line; and a broken line curve indicates values on the meridional image plane of the d line. In the distortional aberration diagrams, the axis of ordinate indicates the angle of view and the axis of abscissa indicates %, and a solid line curve indicates values on the d line. In the comatic aberration diagrams, ω indicates the half angle of view, and a solid line curve indicates values on the d line and a broken line curve indicates values on the g line.

From the aberration diagrams, it can be recognized apparently that the numeral value example 1 has a superior imaging performance in that the aberrations are corrected favorably.

Second Embodiment

Figure 5:
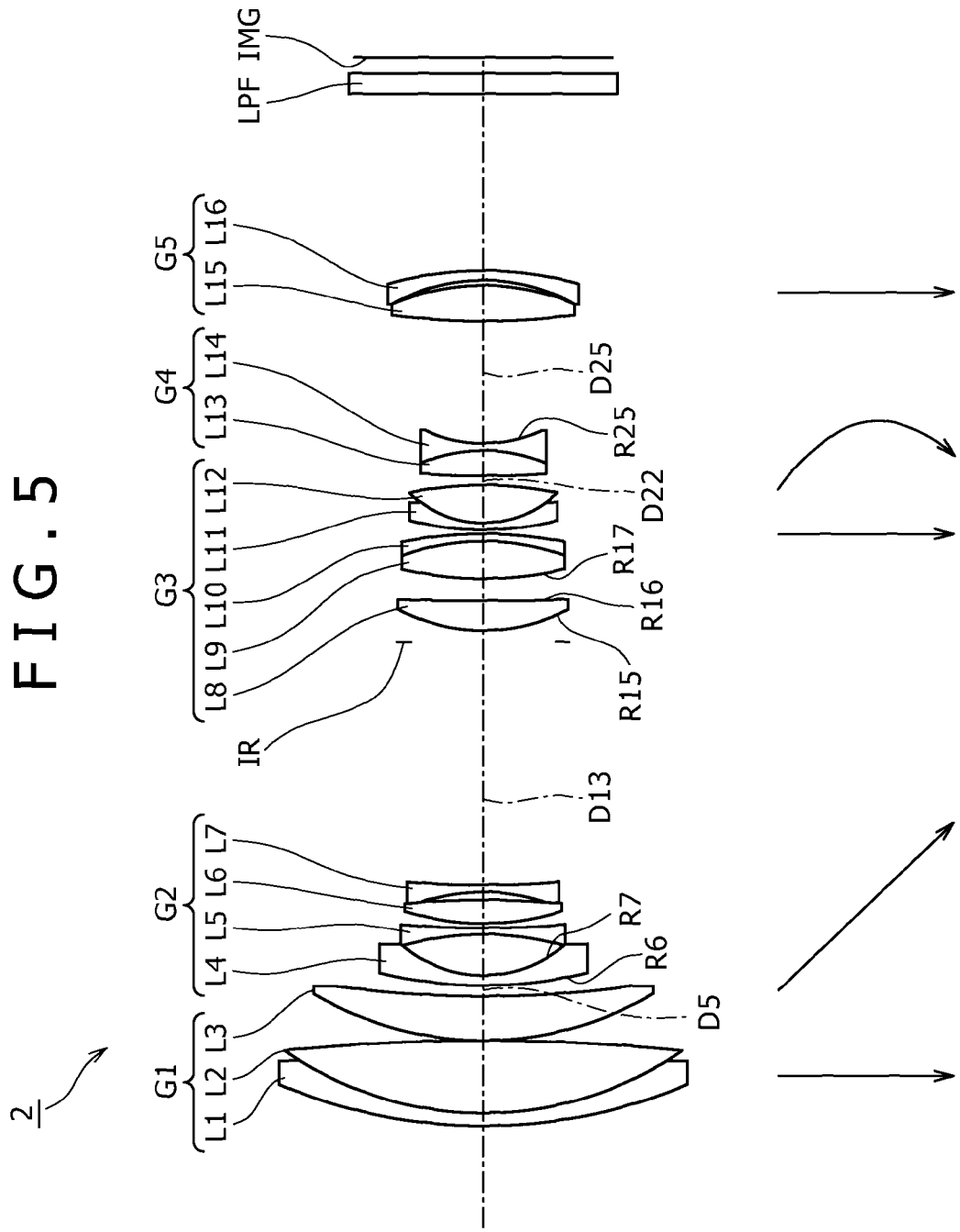
FIG. 5 is a schematic view showing a lens configuration of a zoom lens according to a second embodiment of the present technology.

FIG. 5 shows a lens configuration of a zoom lens 2 according to a second embodiment of the present technology.

The zoom lens 2 has a zoom ratio of 6.37 times.

The zoom lens 2 includes a first lens group G1 having a positive refracting power, a second lens group G2 having a negative refracting power, a third lens group G3 having a positive refracting power, a fourth lens group G4 having a negative refracting power, and a fifth lens group G5 having a positive refracting power. The first lens group G1, second lens group G2, third lens group G3, fourth lens group G4 and fifth lens group G5 are disposed in order from the object side to the image side.

The first lens group G1 is fixed in a direction of an optical axis, and the second lens group G2 is movable in the direction of the optical axis to carry out a zooming action. The third lens group G3 is fixed in the direction of the optical axis, and the fourth lens group G4 is movable in the direction of the optical axis to correct a variation of an image forming position and correct a change of the image forming position caused by a change of the object distance. The fifth lens group G5 is fixed in the direction of the optical axis.

The first lens group G1 is configured from a cemented lens of a negative lens L1 and a positive lens L2 cemented to each other, and a positive lens L3, disposed in order from the object side to the image side.

The second lens group G2 is configured from a negative lens L4, another negative lens L5, a positive lens L6 and a further negative lens L7 disposed in order from the object side to the image side.

The third lens group G3 is configured from a cemented lens of a positive lens L8, another positive lens L9 and a negative lens L10 cemented to each other, and another cemented lens of a negative lens L11 and a positive lens L12 cemented to each other. The lenses are disposed in order from the object side to the image side. The positive lens L9 and the negative lens L10 of the third lens group G3 are movable in a direction substantially perpendicular to the optical axis. Correction of an image blur is carried out by such movement of the positive lens L9 and the negative lens L10 in a direction perpendicular to the optical axis as just described.

The fourth lens group G4 is configured from a cemented lens of a positive lens L13 and a negative lens L14 cemented to each other.

The fifth lens group G5 is configured from a positive lens L15 and a negative lens L16 disposed in order from the object side to the image side.

Between the second lens group G2 and the third lens group G3, an aperture stop IR, namely, a stop surface S14, is disposed at a position in the proximity of the third lens group G3.

A low-pass filter LPF is disposed between the fifth lens group G5 and an image plane IMG.

Table 4 indicates lens data of the numerical value example 2 wherein particular numerical values are applied to the zoom lens 2 according to the second embodiment.

TABLE 4

| Si | Ri | Di | Ni | vi |
|---|---|---|---|---|
| 1 | 58.5477 | 1.400 | 1.92068 | 24.3 |
| 2 | 39.5533 | 7.821 | 1.49700 | 81.6 |
| 3 | −317.2744 | 0.300 | | |
| 4 | 36.2958 | 4.700 | 1.61800 | 63.4 |
| 5 | 142.8279 | Variable | | |
| 6 (ASP) | 69.5339 | 1.100 | 1.88202 | 37.2 |
| 7 (ASP) | 14.0945 | 4.438 | | |
| 8 | −36.1035 | 0.800 | 2.00100 | 29.1 |
| 9 | 73.9817 | 0.500 | | |
| 10 | 28.9431 | 2.531 | 2.10655 | 17.1 |
| 11 | −71.2168 | 0.852 | | |
| 12 | −24.6420 | 0.800 | 1.83481 | 42.7 |
| 13 | 102.1813 | Variable | | |
| 14 (Aperture stop) | Infinity | 1.200 | | |
| 15 (ASP) | 18.1819 | 3.639 | 1.55332 | 71.7 |
| 16 (ASP) | −103.4874 | 2.500 | | |
| 17 (ASP) | 34.1068 | 4.249 | 1.62263 | 58.2 |
| 18 | −22.6219 | 0.800 | 1.84666 | 23.8 |
| 19 | −45.2438 | 0.500 | | |
| 20 | 44.6734 | 0.800 | 2.00100 | 29.1 |

TABLE 4-continued

| Si | Ri | Di | Ni | vi |
|---|---|---|---|---|
| 21 | 11.3651 | 3.590 | 1.62004 | 36.3 |
| 22 | −62.8607 | Variable | | |
| 23 | 115.0018 | 2.954 | 1.84666 | 23.8 |
| 24 | −14.7480 | 0.800 | 1.88202 | 37.2 |
| 25 (ASP) | 18.4320 | Variable | | |
| 26 | 61.6340 | 3.840 | 1.51742 | 52.2 |
| 27 | −25.5238 | 0.600 | | |
| 28 | −19.7926 | 1.100 | 2.00100 | 29.1 |
| 29 | −37.5637 | 19.869 | | |
| 30 | Infinity | 2.000 | 1.51680 | 64.2 |
| 31 | Infinity | 2.000 | | |

In the zoom lens 2, the opposite faces of the negative lens L4 of the second lens group G2, namely, the sixth and seventh faces, the opposite faces of the positive lens L8 of the third lens group G3, namely, the 15th and 16th faces, the object side face of the positive lens L9 of the third lens group G3, namely, the 17th face, and the image side face of the negative lens L14 of the fourth lens group G4, namely, the 25th face, are formed as aspheric faces.

The fourth, sixth, eighth and tenth order aspheric coefficients A4, A6, A8 and A10 of the aspheric faces in the numerical value example 2 are indicated in Table 5 below together with the conic constant κ.

TABLE 5

| Si | K | A4 | A6 | A8 | A10 |
|---|---|---|---|---|---|
| 6 | 0.0000 | 7.83901E−06 | −2.36246E−09 | −2.48384E−10 | 1.27101E−12 |
| 7 | 0.0000 | 1.13294E−05 | 8.09310E−08 | 0.00000E+00 | 0.00000E+00 |
| 15 | −1.8468 | 2.12827E−05 | 8.60266E−08 | 3.16062E−10 | 9.36198E−13 |
| 16 | 0.0000 | 2.16975E−05 | 1.08126E−07 | 0.00000E+00 | 0.00000E+00 |
| 17 | 0.0000 | −1.20606E−05 | 5.04612E−08 | −9.72351E−10 | 3.87902E−12 |
| 25 | 0.0000 | −1.33198E−05 | −3.94224E−08 | 7.38435E−11 | −2.65679E−12 |

In the zoom lens 2, upon zooming between the wide angle end state and the telephoto end state, the face distance D5 between the first lens group G1 and the second lens group G2, the face distance D13 between the second lens group G2 and the aperture stop IR, the face distance D22 between the third lens group G3 and the fourth lens group G4, and the face distance D25 between the fourth lens group G4 and the fifth lens group G5 vary.

The variable distances in the wide angle end state, an intermediate focal length state and the telephoto end state among the face distances in the numerical value example 2 are indicated in Table 6 below together with the F number Fno and the half angle ω of view.

TABLE 6

| | Wide angle end | Intermediate length | Telephoto end |
|---|---|---|---|
| f | 24.74 | 62.45 | 157.66 |
| Fno | 4.06 | 5.06 | 5.77 |
| ω (Degree) | 30.07 | 11.97 | 4.77 |
| D5 | 1.200 | 15.636 | 26.340 |
| D13 | 27.640 | 13.204 | 2.500 |
| D22 | 0.997 | 6.047 | 4.213 |
| D25 | 13.481 | 8.431 | 10.265 |

Figure 6:
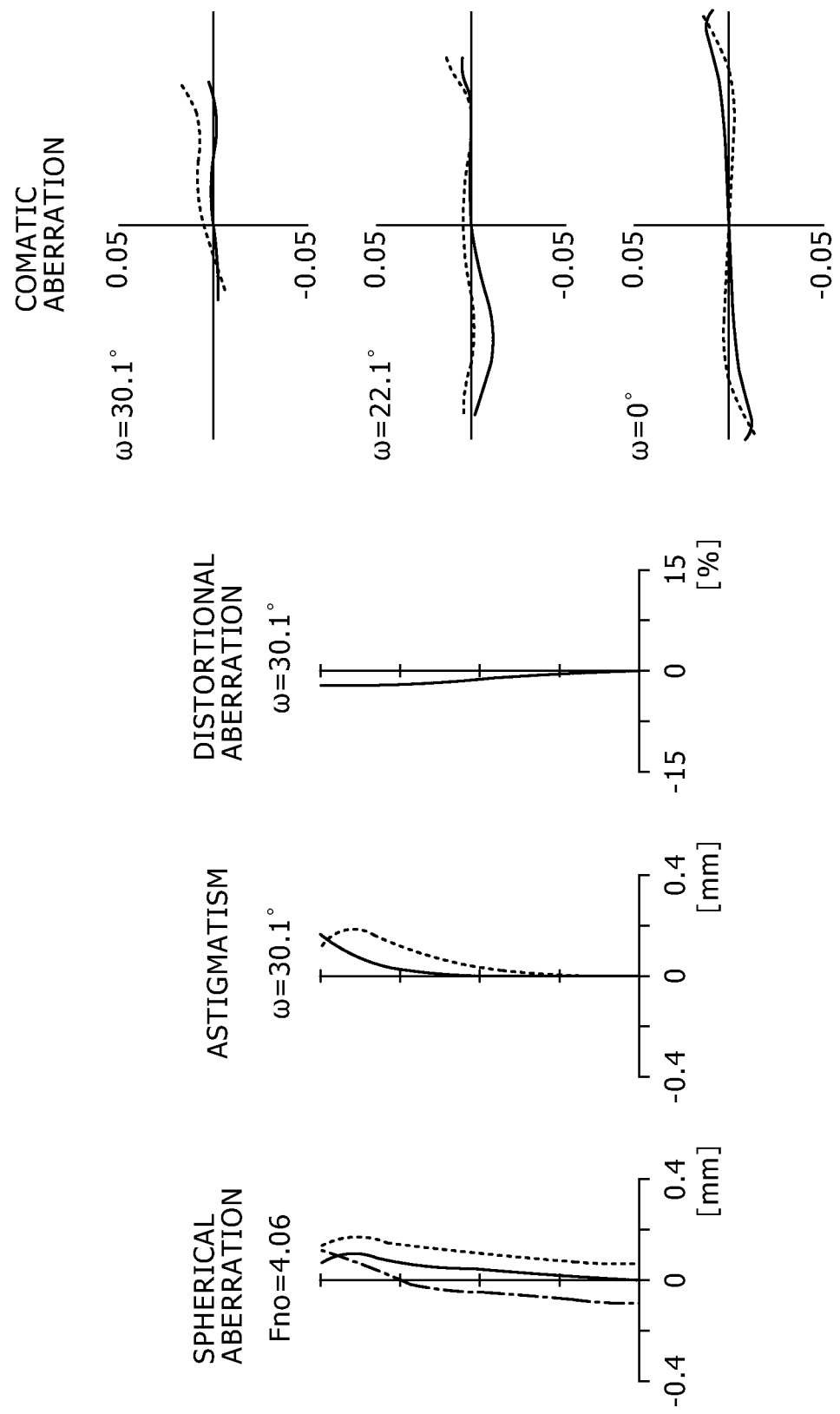
FIG. 6 is a diagrammatic view illustrating a spherical aberration, an astigmatism, a distortional aberration and comatic aberrations in a wide angle end state of the zoom lens of FIG. 5 according to a numerical value example wherein particular numerical values are applied to the zoom lens together with FIGS. 7 and 8.
Figure 7:
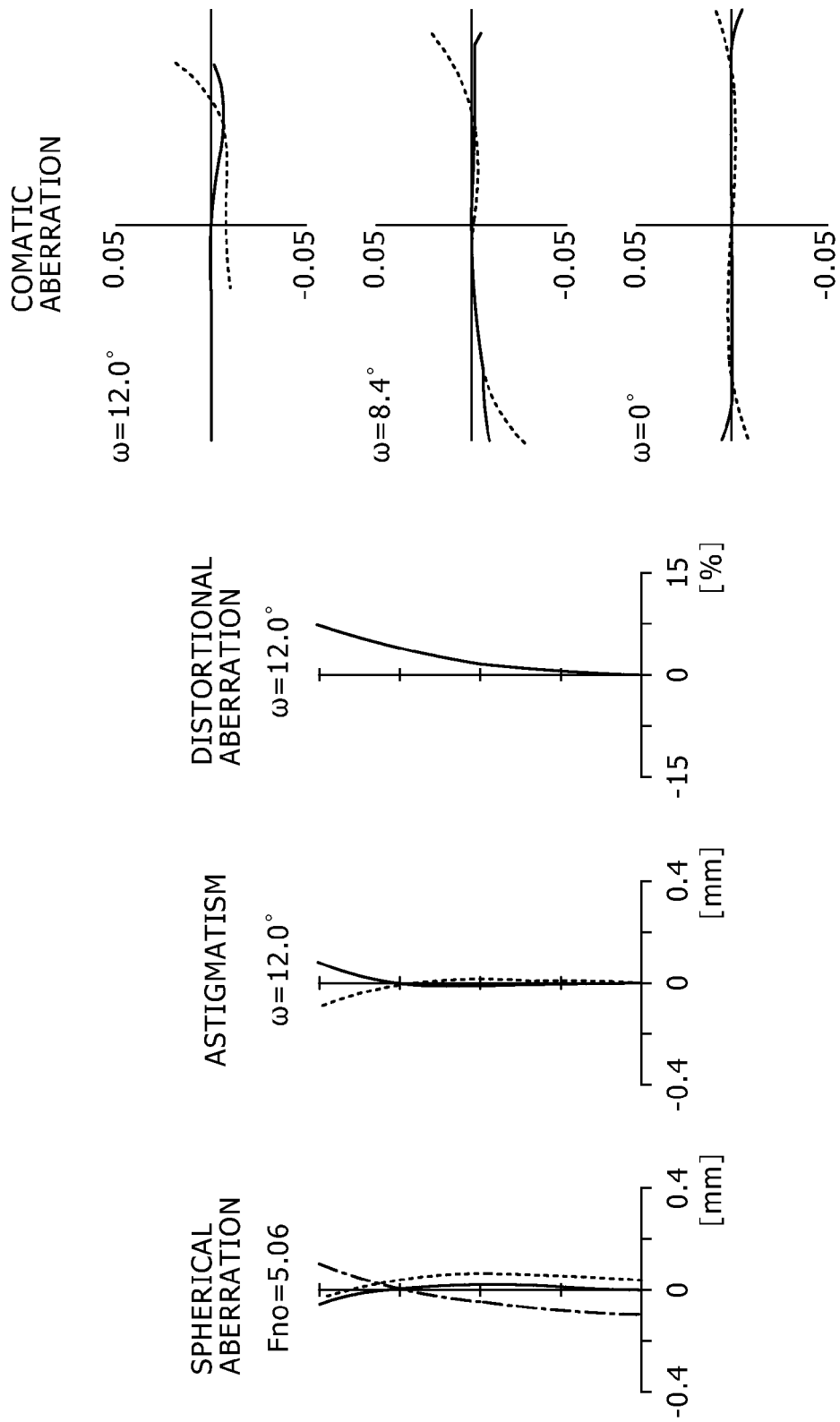
FIG. 7 is a similar view but illustrating a spherical aberration, an astigmatism, a distortional aberration and comatic aberrations of the zoom lens of FIG. 5 in an intermediate focal length state.
Figure 8:
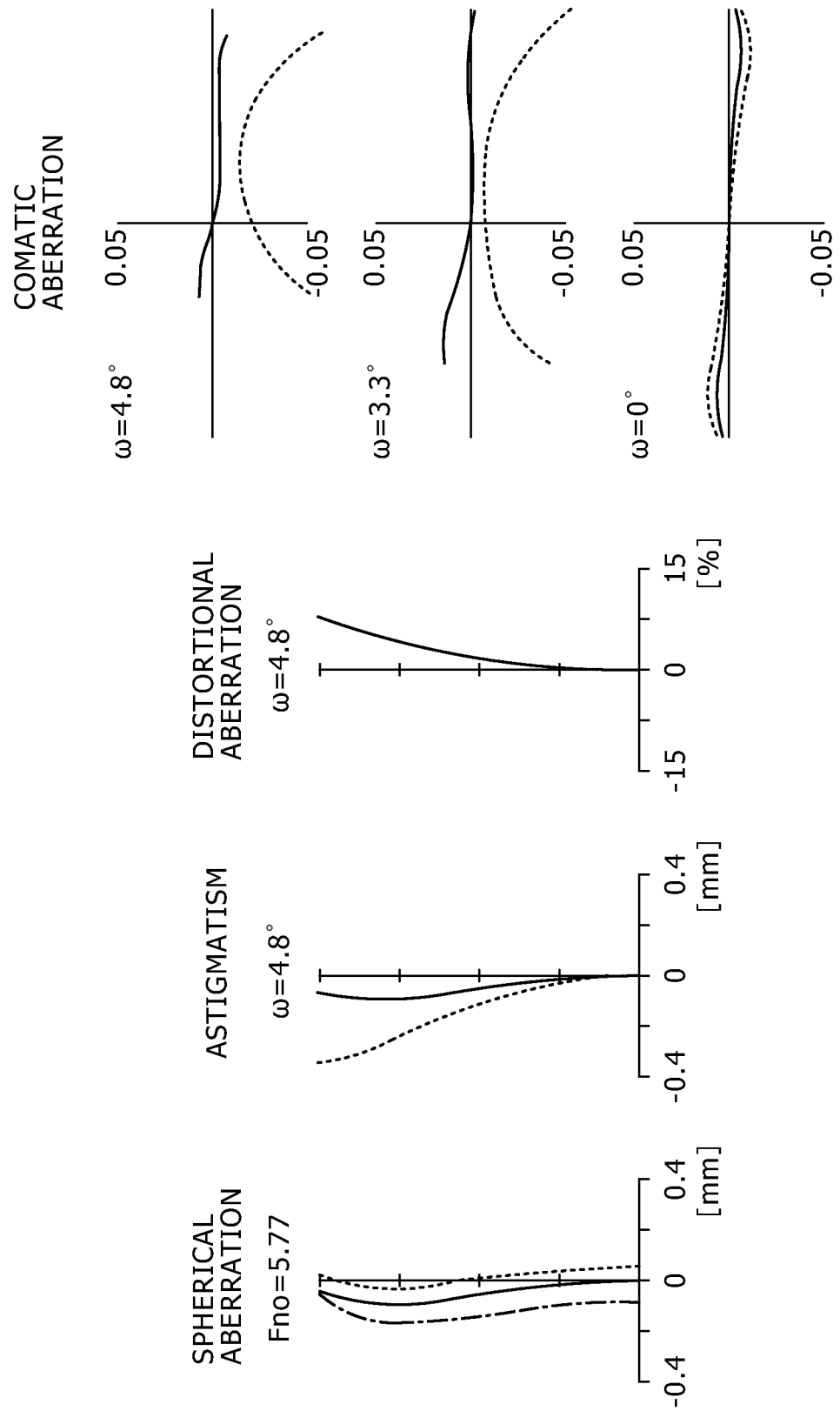
FIG. 8 is a similar view but illustrating a spherical aberration, an astigmatism, a distortional aberration and comatic aberrations of the zoom lens of FIG. 5 in a telephoto end state.

FIGS. 6 to 8 illustrate various aberrations in the numerical value example 2. Particularly, FIG. 6 illustrates the aberrations in an infinitely remotely focused state in the wide angle state; FIG. 7 illustrates the aberrations in an infinitely remotely focused state in an intermediate focal length state; and FIG. 8 illustrates the aberrations in an infinitely remotely focused state in the telephoto end state.

In the spherical aberration diagrams of FIGS. 6 to 8, the axis of ordinate indicates the ratio of the spherical aberration to the open F value and the axis of abscissa indicates the defocus amount. Further, a solid line curve indicates values on the d line (wavelength: 587.56 nm); a broken line curve indicates values on the C line (wavelength: 656.3 nm); and an alternate long and short dash line curve indicates values on the g line (wavelength: 435.8 nm). In the astigmatism diagrams, the axis of ordinate indicates the angle of view and the axis of abscissa indicates the defocus amount. Further, a solid line curve indicates values on the sagittal image plane of the d line; and a broken line curve indicates values on the meridional image plane of the d line. In the distortional aberration diagrams, the axis of ordinate indicates the angle of view and the axis of abscissa indicates %, and a solid line curve indicates values on the d line. In the comatic aberration diagrams, ω indicates the half angle of view, and a solid line curve indicates values on the d line and a broken line curve indicates values on the g line.

From the aberration diagrams, it can be recognized apparently that the numeral value example 2 has a superior imaging performance in that the aberrations are corrected favorably.

Third Embodiment

Figure 9:
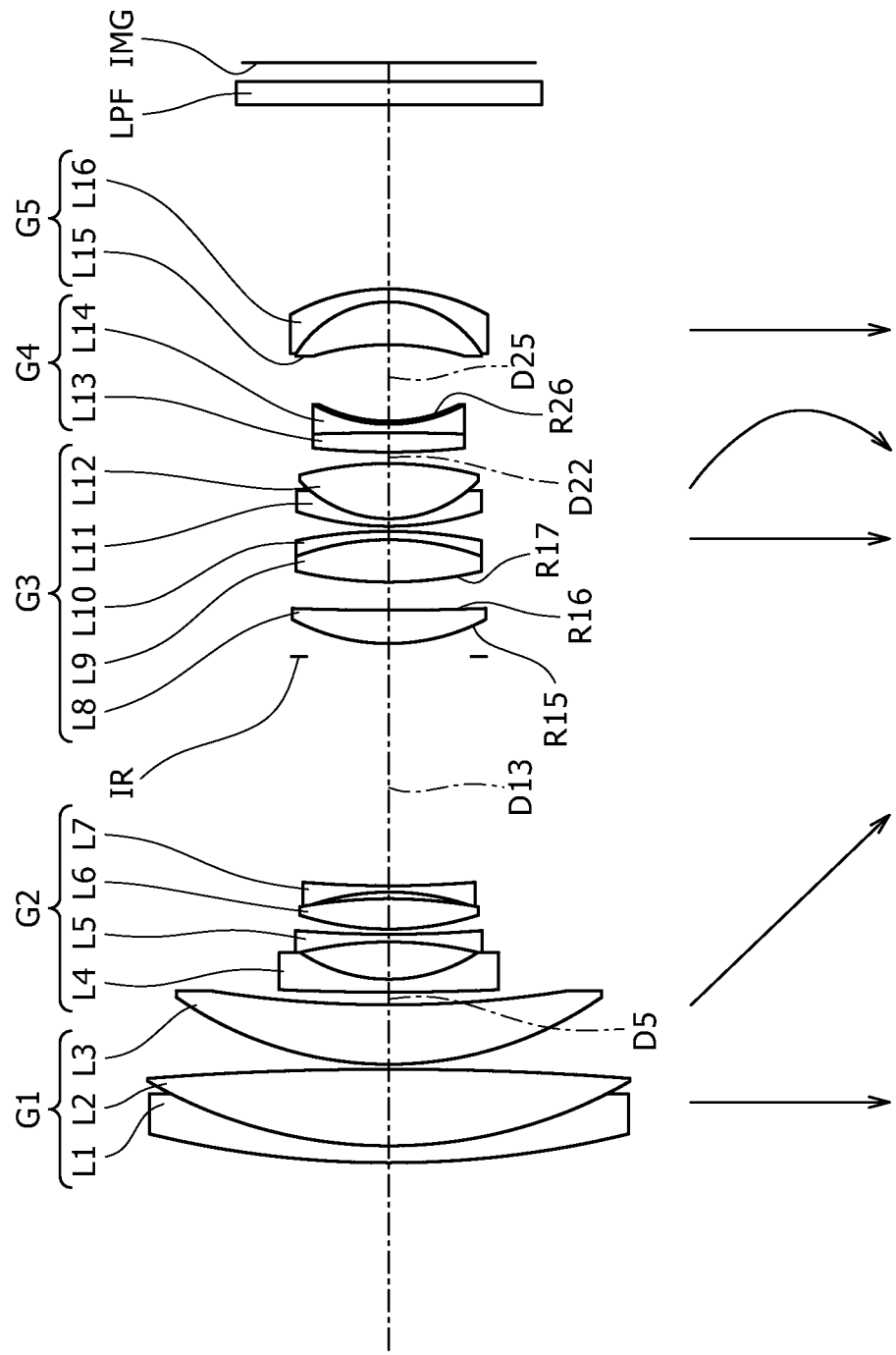
FIG. 9 is a schematic view showing a lens configuration of a zoom lens according to a third embodiment of the present technology.

FIG. 9 shows a lens configuration of a zoom lens 3 according to a third embodiment of the present technology.

The zoom lens 3 has a zoom ratio of 3.65 times.

The zoom lens 3 includes a first lens group G1 having a positive refracting power, a second lens group G2 having a negative refracting power, a third lens group G3 having a positive refracting power, a fourth lens group G4 having a negative refracting power, and a fifth lens group G5 having a positive refracting power. The first lens group G1, second lens group G2, third lens group G3, fourth lens group G4 and fifth lens group G5 are disposed in order from the object side to the image side.

The first lens group G1 is fixed in a direction of an optical axis, and the second lens group G2 is movable in the direction of the optical axis to carry out a zooming action. The third lens group G3 is fixed in the direction of the optical axis, and the fourth lens group G4 is movable in the direction of the optical axis to correct a variation of an image forming position and correct a change of the image forming position caused by a change of an object distance. The fifth lens group G5 is fixed in the direction of the optical axis.

The first lens group G1 is configured from a cemented lens of a negative lens L1 and a positive lens L2 cemented to each other, and a positive lens L3, disposed in order from the object side to the image side.

The second lens group G2 is configured from a negative lens L4, another negative lens L5, a positive lens L6 and a further negative lens L7 disposed in order from the object side to the image side.

The third lens group G3 is configured from a cemented lens of a positive lens L8, another positive lens L9 and a negative lens L10 cemented to each other, and another cemented lens of a negative lens L11 and a positive lens L12 cemented to each other. The lenses are disposed in order from the object side to the image side. The positive lens L9 and the negative lens L10 of the third lens group G3 are movable in a direction substantially perpendicular to the optical axis. Correction of an image blur is carried out by such movement of the positive lens L9 and the negative lens L10 in a direction perpendicular to the optical axis as just described.

The fourth lens group G4 is configured from a cemented lens of a positive lens L13 and a negative lens L14 cemented to each other. The negative lens L14 has a face on the image side formed as a complex aspherical face.

The fifth lens group G5 is configured from a cemented lens of a positive lens L15 and a negative lens L16 cemented to each other.

Between the second lens group G2 and the third lens group G3, an aperture stop IR, namely, a stop surface S14, is disposed at a position in the proximity of the third lens group G3.

A low-pass filter LPF is disposed between the fifth lens group G5 and an image plane IMG.

Table 7 indicates lens data of the numerical value example 3 wherein particular numerical values are applied to the zoom lens 3 according to the third embodiment.

In the zoom lens 3, the opposite faces of the positive lens L8 of the third lens group G3, namely, the 15th and 16th faces, the object side face of the positive lens L9 of the third lens group G3, namely, the 17th face, and the image side face of the negative lens L14 of the fourth lens group G4, namely, the 25th face, are formed as aspheric faces.

The fourth, sixth, eighth and tenth order aspheric coefficients A4, A6, A8 and A10 of the aspheric faces in the numerical value example 3 are indicated in Table 8 below together with the conic constant κ.

TABLE 8

| Si | K | A4 | A6 | A8 | A10 |
|---|---|---|---|---|---|
| 15 | −1.8468 | 4.13354E−05 | 1.44507E−07 | −1.21059E−10 | 4.59113E−12 |
| 16 | 0.0000 | 4.76472E−05 | 1.71459E−07 | 0.00000E+00 | 0.00000E+00 |
| 17 | 0.0000 | −1.51881E−05 | 4.62539E−08 | −5.10640E−10 | 1.31745E−12 |
| 26 | 0.0000 | −1.73573E−06 | −1.92263E−07 | −6.02862E−10 | 9.86063E−12 |

In the zoom lens 3, upon zooming between the wide angle end state and the telephoto end state, the face distance D5 between the first lens group G1 and the second lens group G2, the face distance D13 between the second lens group G2 and the aperture stop IR, the face distance D22 between the third lens group G3 and the fourth lens group G4 and the face distance D25 between the fourth lens group G4 and the fifth lens group G5 vary.

The variable distances in the wide angle end state, an intermediate focal length state and the telephoto end state among the face distances in the numerical value example 3 are indicated in Table 9 below together with the F number Fno and the half angle ω of view.

TABLE 7

| Si | Ri | Di | Ni | νi |
|---|---|---|---|---|
| 1 | 98.1510 | 1.400 | 1.84666 | 23.8 |
| 2 | 45.3791 | 7.062 | 1.59282 | 68.6 |
| 3 | −206.2532 | 0.300 | | |
| 4 | 32.7607 | 5.440 | 1.72916 | 54.7 |
| 5 | 113.5786 | Variable | | |
| 6 | 167.8802 | 1.100 | 2.00100 | 29.1 |
| 7 | 14.5482 | 3.490 | | |
| 8 | −36.5927 | 0.800 | 1.91082 | 35.3 |
| 9 | 75.0805 | 0.500 | | |
| 10 | 32.2931 | 2.540 | 1.94595 | 18.0 |
| 11 | −42.1327 | 0.565 | | |
| 12 | −23.9549 | 0.800 | 1.77250 | 49.6 |
| 13 | −154.0309 | Variable | | |
| 14 (Aperture stop) | Infinity | 1.200 | | |
| 15 (ASP) | 17.0341 | 3.065 | 1.59201 | 67.0 |
| 16 (ASP) | 306.9653 | 2.500 | | |
| 17 (ASP) | 49.9891 | 3.884 | 1.61881 | 63.9 |
| 18 | −22.3637 | 0.800 | 1.69895 | 30.1 |
| 19 | −47.7575 | 0.500 | | |
| 20 | 26.2682 | 0.800 | 1.91082 | 35.3 |
| 21 | 10.8384 | 5.107 | 1.51680 | 64.2 |
| 22 | −27.0894 | Variable | | |
| 23 | 66.4235 | 1.708 | 1.84666 | 23.8 |
| 24 | −104.4315 | 0.700 | 1.72916 | 54.7 |
| 25 | 13.9764 | 0.250 | 1.53610 | 41.2 |
| 26 (ASP) | 14.2233 | Variable | | |
| 27 | −22.8967 | 3.876 | 1.48749 | 70.5 |
| 28 | −9.7361 | 1.200 | 1.91082 | 35.3 |
| 29 | −17.7267 | 16.461 | | |
| 30 | Infinity | 2.000 | 1.51680 | 64.2 |
| 31 | Infinity | 2.000 | | |

TABLE 9

| | Wide angle end | Intermediate length | Telephoto end |
|---|---|---|---|
| f | 25.80 | 49.26 | 94.05 |
| Fno | 3.55 | 3.55 | 3.54 |
| ω (Degree) | 28.86 | 14.72 | 7.70 |
| D5 | 1.200 | 11.420 | 19.422 |
| D13 | 20.722 | 10.502 | 2.500 |
| D22 | 0.992 | 2.966 | 1.295 |
| D26 | 7.039 | 5.065 | 6.736 |

Figure 10:
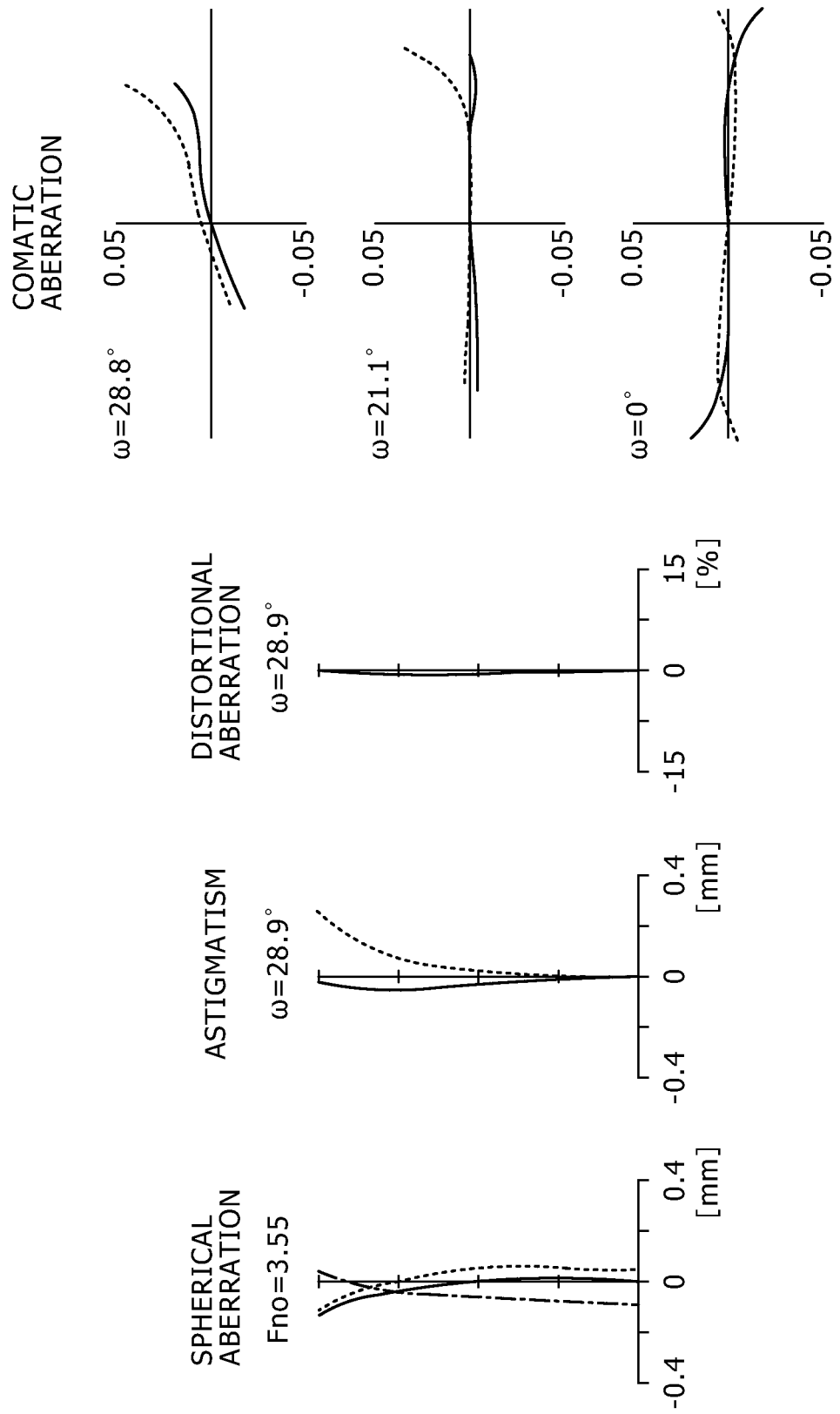
FIG. 10 is a diagrammatic view illustrating a spherical aberration, an astigmatism, a distortional aberration and comatic aberrations in a wide angle end state of the zoom lens of FIG. 9 according to a numerical value example wherein particular numerical values are applied to the zoom lens together with FIGS. 11 and 12.
Figure 11:
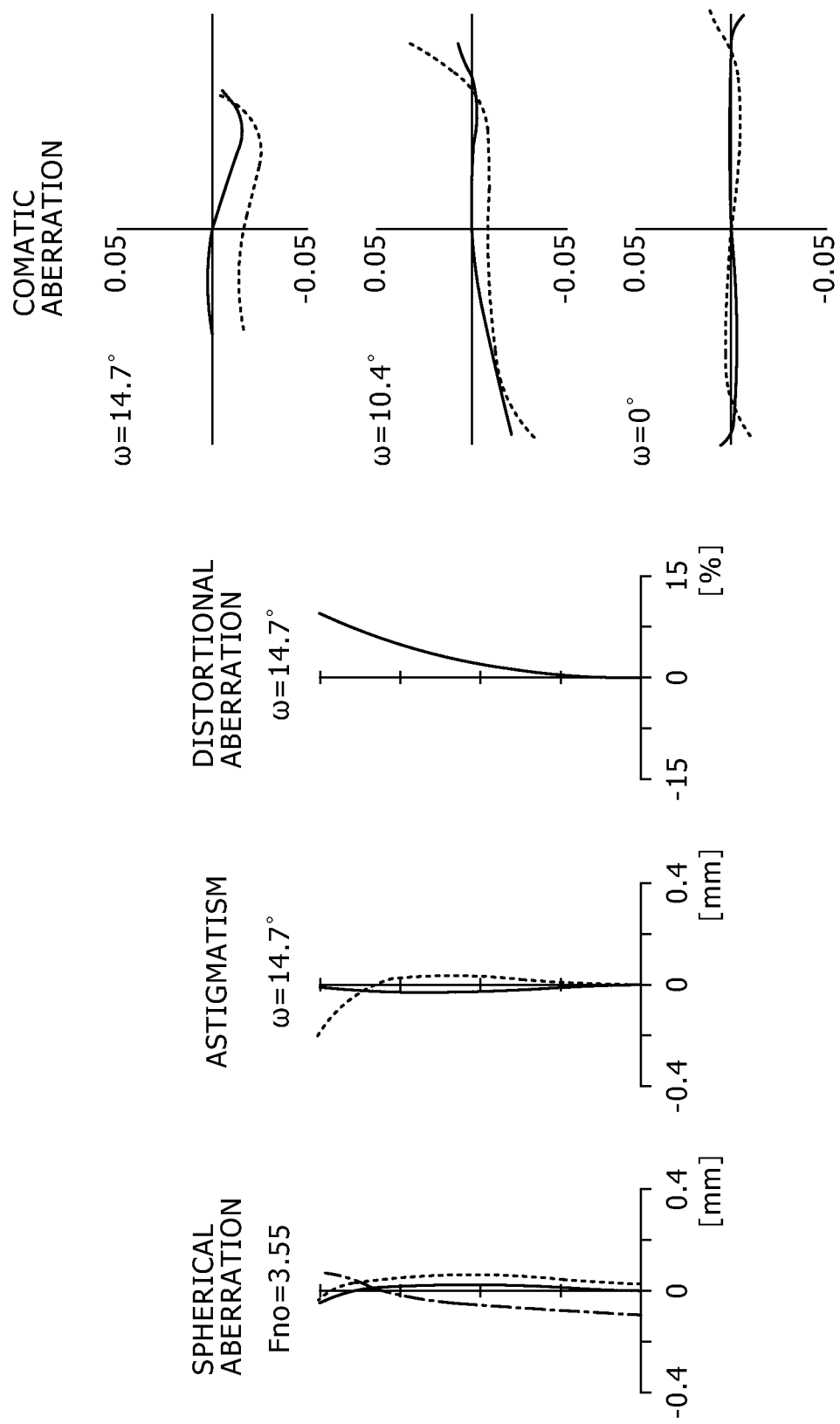
FIG. 11 is a similar view but illustrating a spherical aberration, an astigmatism, a distortional aberration and comatic aberrations of the zoom lens of FIG. 9 in an intermediate focal length state.
Figure 12:
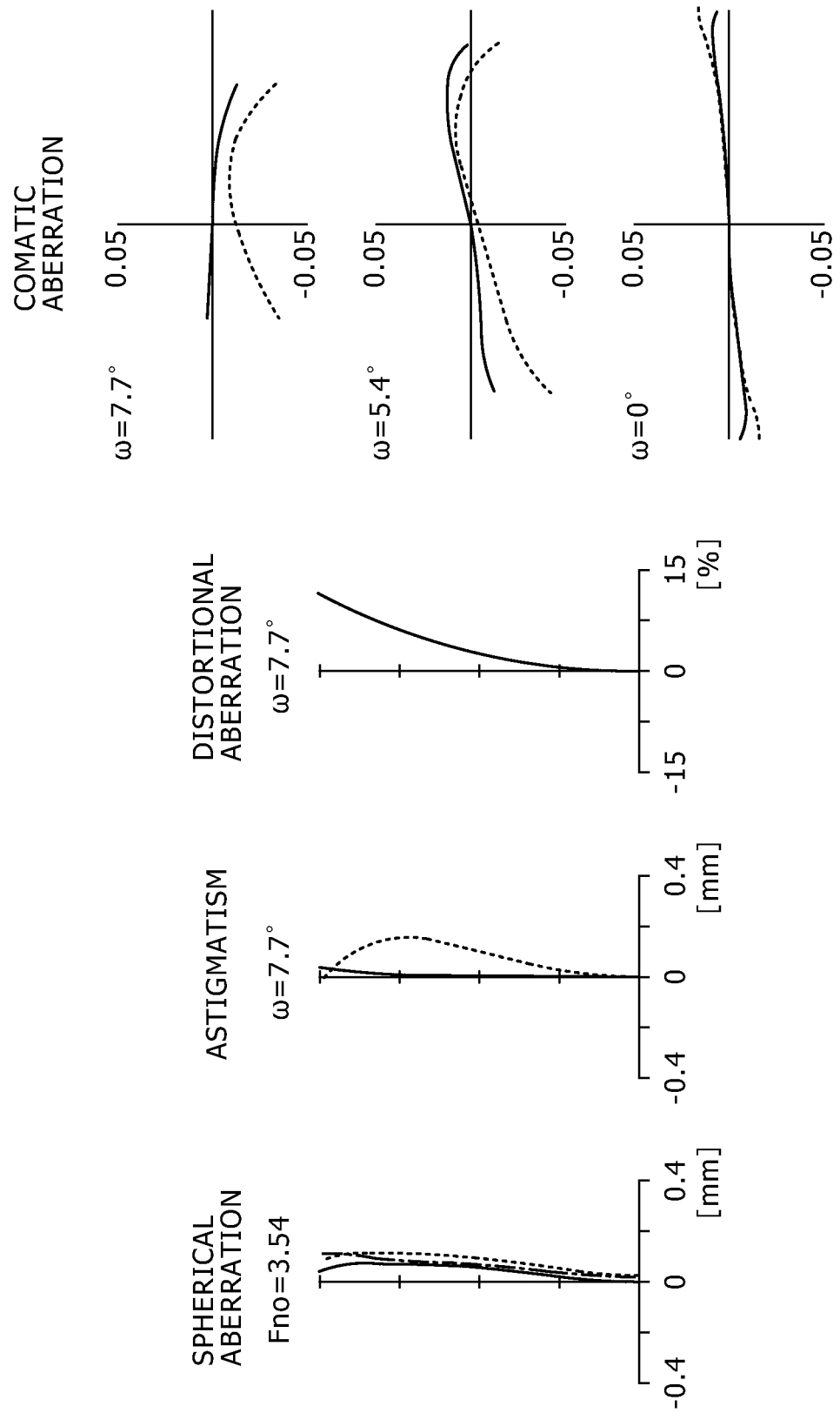
FIG. 12 is a similar view but illustrating a spherical aberration, an astigmatism, a distortional aberration and comatic aberrations of the zoom lens of FIG. 9 in a telephoto end state.

FIGS. 10 to 12 illustrate various aberrations in the numerical value example 3. Particularly, FIG. 10 illustrates the aberrations in an infinitely remotely focused state in the wide angle state; FIG. 11 illustrates the aberrations in an infinitely remotely focused state in an intermediate focal length state; and FIG. 12 illustrates the aberrations in an infinitely remotely focused state in the telephoto end state.

In the spherical aberration diagrams of FIGS. 10 to 12, the axis of ordinate indicates the ratio of the spherical aberration to the open F value and the axis of abscissa indicates the defocus amount. Further, a solid line curve indicates values on the d line (wavelength: 587.56 nm); a broken line curve indicates values on the C line (wavelength: 656.3 nm); and an alternate long and short dash line curve indicates values on the g line (wavelength: 435.8 nm). In the astigmatism diagrams, the axis of ordinate indicates the angle of view and the axis of abscissa indicates the defocus amount. Further, a solid line curve indicates values on the sagittal image plane of the d line; and a broken line curve indicates values on the meridional image plane of the d line. In the distortional aberration diagrams, the axis of ordinate indicates the angle of view and the axis of abscissa indicates %, and a solid line curve indicates values on the d line. In the comatic aberration diagrams, ω indicates the half angle of view, and a solid line curve indicates values on the d line and a broken line curve indicates values on the g line.

From the aberration diagrams, it can be recognized apparently that the numeral value example 3 has a superior imaging performance in that the aberrations are corrected favorably.

Fourth Embodiment

Figure 13:
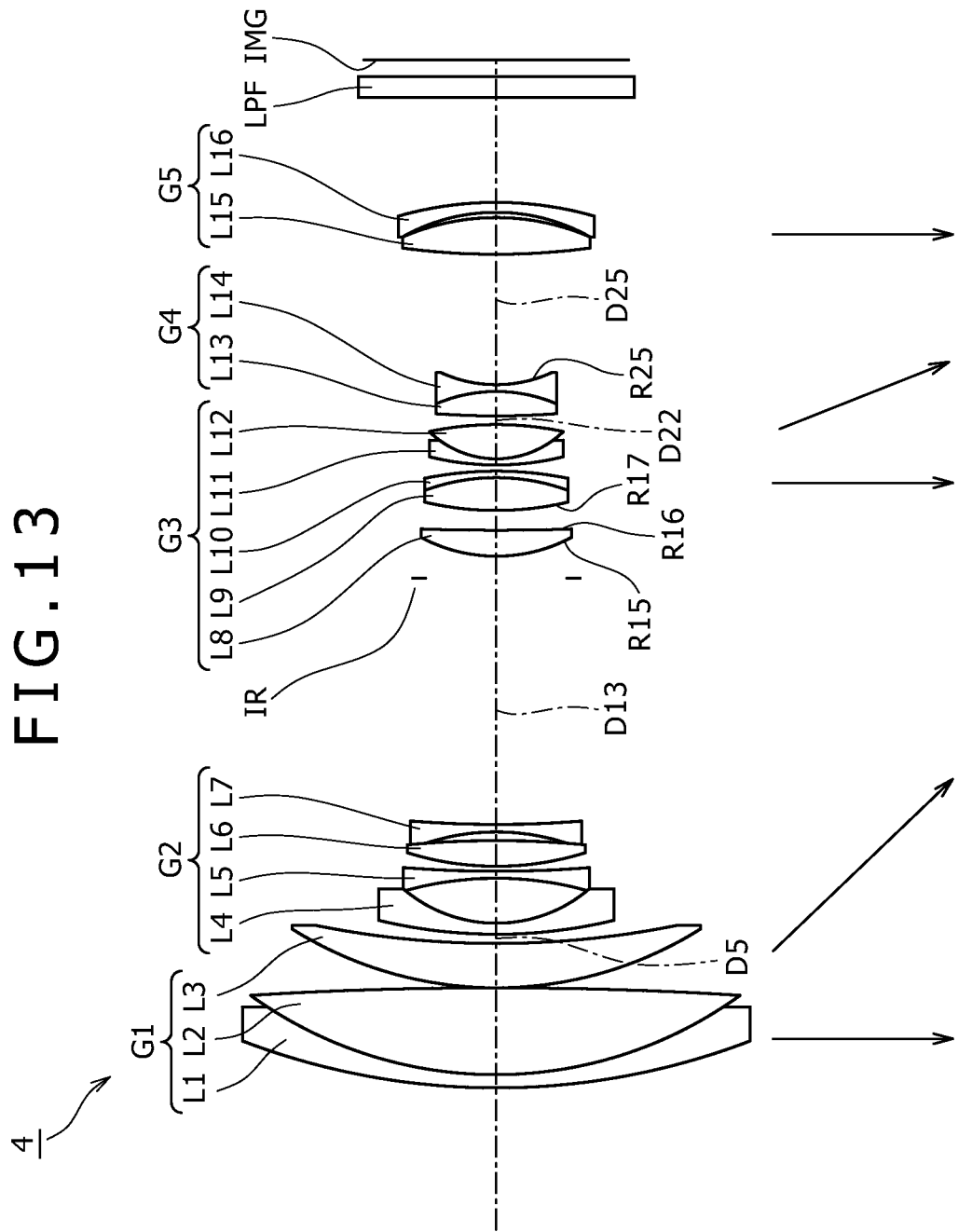
FIG. 13 is a schematic view showing a lens configuration of a zoom lens according to a fourth embodiment of the present technology.

FIG. 13 shows a lens configuration of a zoom lens 4 according to a fourth embodiment of the present technology.

The zoom lens 4 has a zoom ratio of 5.49 times.

The zoom lens 4 includes a first lens group G1 having a positive refracting power, a second lens group G2 having a negative refracting power, a third lens group G3 having a positive refracting power, a fourth lens group G4 having a negative refracting power, and a fifth lens group G5 having a positive refracting power. The first lens group G1, second lens group G2, third lens group G3, fourth lens group G4 and fifth lens group G5 are disposed in order from the object side to the image side.

The first lens group G1 is fixed in a direction of an optical axis, and the second lens group G2 is movable in the direction of the optical axis to carry out a zooming action. The third lens group G3 is fixed in the direction of the optical axis, and the fourth lens group G4 is movable in the direction of the optical axis to correct a variation of an image forming position and correct a change of the image forming position caused by a change of an object distance. The fifth lens group G5 is fixed in the direction of the optical axis.

The first lens group G1 is configured from a cemented lens of a negative lens L1 and a positive lens L2 cemented to each other, and a positive lens L3, disposed in order from the object side to the image side.

The second lens group G2 is configured from a negative lens L4, another negative lens L5, a positive lens L6 and a further negative lens L7 disposed in order from the object side to the image side.

The third lens group G3 is configured from a cemented lens of a positive lens L8, another positive lens L9 and a negative lens L10 cemented to each other, and another cemented lens of a negative lens L11 and a positive lens L12 cemented to each other. The lenses are disposed in order from the object side to the image side. The positive lens L9 and the negative lens L10 of the third lens group G3 are movable in a direction substantially perpendicular to the optical axis. Correction of an image blur is carried out by such movement of the positive lens L9 and the negative lens L10 in a direction perpendicular to the optical axis as just described.

The fourth lens group G4 is configured from a cemented lens of a positive lens L13 and a negative lens L14 cemented to each other.

The fifth lens group G5 is configured from a positive lens L15 and a negative lens L16 disposed in order from the object side to the image side.

Between the second lens group G2 and the third lens group G3, an aperture stop IR, namely, a stop surface S14, is disposed at a position in the proximity of the third lens group G3.

A low-pass filter LPF is disposed between the fifth lens group G5 and an image plane IMG.

Table 10 indicates lens data of the numerical value example 4 wherein particular numerical values are applied to the zoom lens 4 according to the fourth embodiment.

TABLE 10

| Si | Ri | Di | Ni | vi |
|---|---|---|---|---|
| 1 | 93.0920 | 1.500 | 1.84666 | 23.8 |
| 2 | 52.6581 | 9.935 | 1.59282 | 68.6 |
| 3 | −1003.1742 | 0.300 | | |
| 4 | 46.4567 | 5.793 | 1.72916 | 54.7 |
| 5 | 142.2925 | Variable | | |
| 6 | 162.6299 | 1.100 | 2.00100 | 29.1 |
| 7 | 15.2134 | 5.717 | | |
| 8 | −38.8318 | 0.800 | 1.88100 | 40.1 |
| 9 | 63.4078 | 0.500 | | |
| 10 | 31.7217 | 4.033 | 1.92286 | 20.9 |
| 11 | −36.2540 | 0.500 | | |
| 12 | −27.3546 | 0.800 | 1.77250 | 49.6 |
| 13 | 200.5999 | Variable | | |
| 14 (Aperture stop) | Infinity | 1.200 | | |
| 15 (ASP) | 18.9809 | 3.373 | 1.58313 | 59.5 |
| 16 (ASP) | −113.1990 | 2.000 | | |
| 17 (ASP) | 47.1293 | 3.251 | 1.59201 | 67.0 |
| 18 | −30.0321 | 0.800 | 1.72825 | 28.3 |
| 19 | −66.9897 | 0.500 | | |
| 20 | 34.1161 | 0.800 | 1.91082 | 35.3 |
| 21 | 12.3129 | 4.262 | 1.48749 | 70.5 |
| 22 | −30.0706 | Variable | | |
| 23 | 154.0318 | 2.688 | 1.84666 | 23.8 |
| 24 | −20.1766 | 0.800 | 1.85135 | 40.1 |
| 25 (ASP) | 16.6588 | Variable | | |
| 26 | 198.0106 | 4.858 | 1.49700 | 81.6 |
| 27 | −20.1735 | 0.800 | | |
| 28 | −16.8842 | 1.100 | 1.92286 | 20.9 |
| 29 | −24.6555 | 13.276 | | |
| 30 | Infinity | 2.000 | 1.51680 | 64.2 |
| 31 | Infinity | 2.000 | | |

In the zoom lens 4, the opposite faces of the positive lens L8 of the third lens group G3, namely, the 15th and 16th faces, the object side face of the positive lens L9 of the third lens group G3, namely, the 17th face, and the image side face of the negative lens L14 of the fourth lens group G4, namely, the 25th face, are formed as aspheric faces.

The fourth, sixth, eighth and tenth order aspheric coefficients A4, A6, A8 and A10 of the aspheric faces in the numerical value example 4 are indicated in Table 11 below together with the conic constant κ.

TABLE 11

| Si | K | A4 | A6 | A8 | A10 |
|---|---|---|---|---|---|
| 15 | 0.0000 | −1.26807E−05 | 1.46574E−09 | −1.11820E−10 | −2.44079E−13 |
| 16 | 0.0000 | 3.18362E−05 | −3.28129E−08 | 0.00000E+00 | 0.00000E+00 |
| 17 | 0.0000 | −5.54291E−06 | −4.94157E−08 | 1.24417E−10 | 1.53306E−12 |
| 25 | 0.0000 | 8.49625E−07 | −3.33440E−07 | 5.43190E−09 | −4.75194E−11 |

In the zoom lens 4, upon zooming between the wide angle end state and the telephoto end state, the face distance D5 between the first lens group G1 and the second lens group G2, the face distance D13 between the second lens group G2 and the aperture stop IR, the face distance D22 between the third lens group G3 and the fourth lens group G4 and the face distance D25 between the fourth lens group G4 and the fifth lens group G5 vary.

The variable distances in the wide angle end state, an intermediate focal length state and the telephoto end state among the face distances in the numerical value example 4 are indicated in Table 12 below together with the F number Fno and the half angle ω of view.

TABLE 12

|   | Wide angle end | Intermediate length | Telephoto end |
|---|---|---|---|
| f | 18.55 | 43.48 | 101.75 |
| Fno | 3.58 | 3.90 | 4.10 |
| ω (Degree) | 38.04 | 16.38 | 7.11 |
| D5 | 1.200 | 18.322 | 30.738 |
| D13 | 32.338 | 15.215 | 2.800 |
| D22 | 1.005 | 5.226 | 8.768 |
| D25 | 15.773 | 11.552 | 8.009 |

Figure 14:
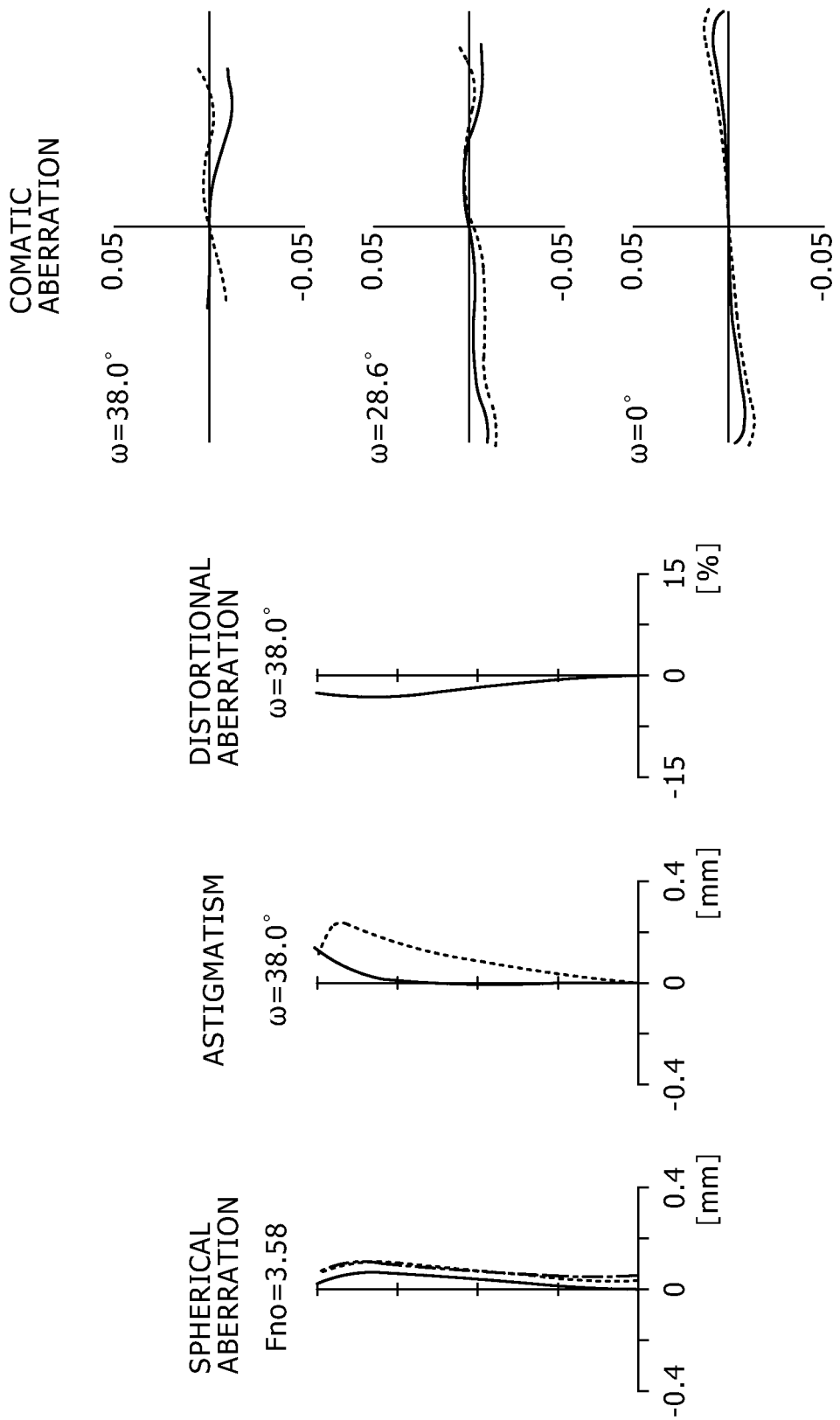
FIG. 14 is a diagrammatic view illustrating a spherical aberration, an astigmatism, a distortional aberration and comatic aberrations in a wide angle end state of the zoom lens of FIG. 13 according to a numerical value example wherein particular numerical values are applied to the zoom lens together with FIGS. 15 and 16.
Figure 15:
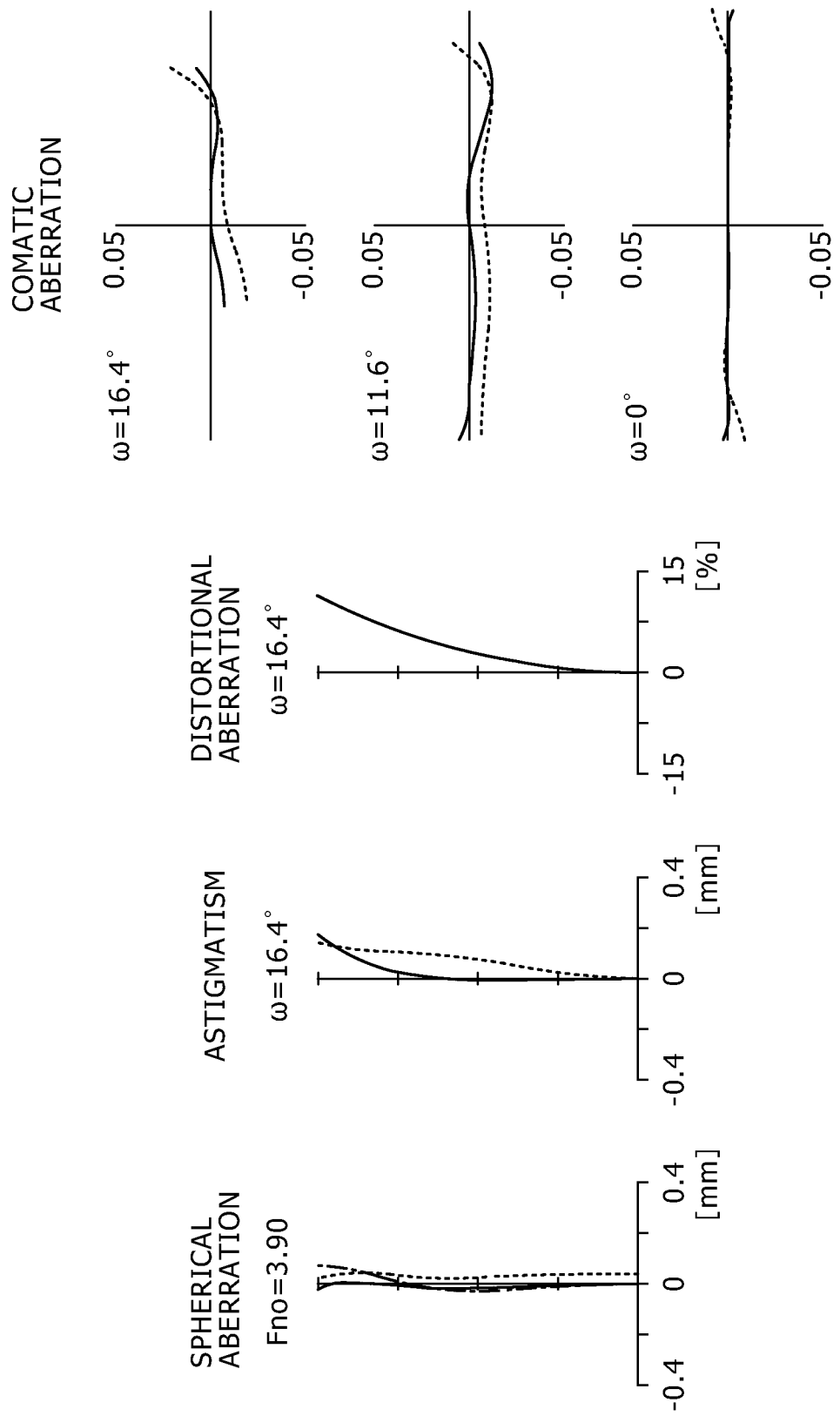
FIG. 15 is a similar view but illustrating a spherical aberration, an astigmatism, a distortional aberration and comatic aberrations of the zoom lens of FIG. 13 in an intermediate focal length state.
Figure 16:
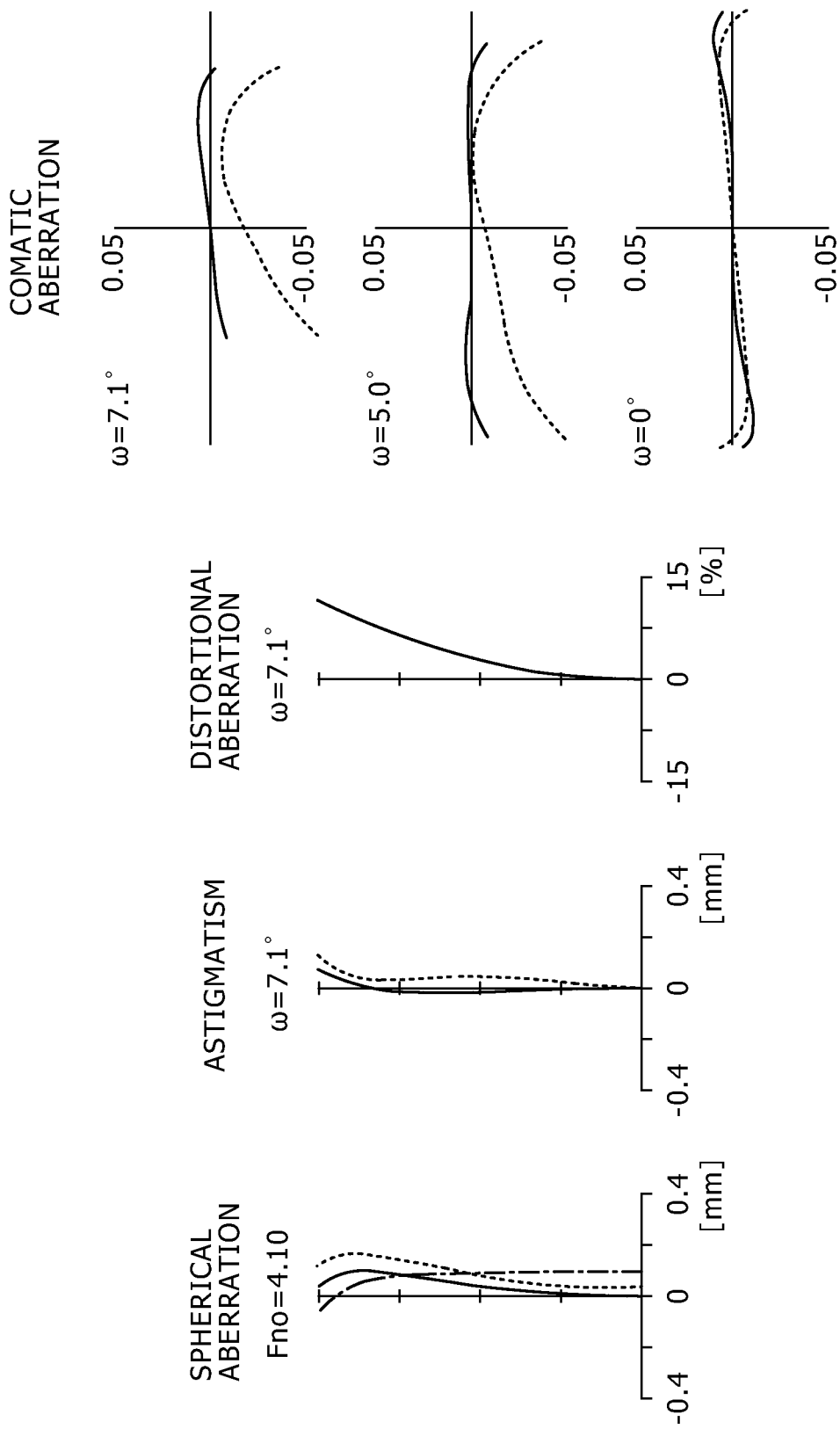
FIG. 16 is a similar view but illustrating a spherical aberration, an astigmatism, a distortional aberration and comatic aberrations of the zoom lens of FIG. 13 in a telephoto end state.

FIGS. 14 to 16 illustrate various aberrations in the numerical value example 4. Particularly, FIG. 14 illustrates the aberrations in an infinitely remotely focused state in the wide angle state; FIG. 15 illustrates the aberrations in an infinitely remotely focused state in an intermediate focal length state; and FIG. 16 illustrates the aberrations in an infinitely remotely focused state in the telephoto end state.

In the spherical aberration diagrams of FIGS. 14 to 16, the axis of ordinate indicates the ratio of the spherical aberration to the open F value and the axis of abscissa indicates the defocus amount. Further, a solid line curve indicates values on the d line (wavelength: 587.56 nm); a broken line curve indicates values on the C line (wavelength: 656.3 nm); and an alternate long and short dash line curve indicates values on the g line (wavelength: 435.8 nm). In the astigmatism diagrams, the axis of ordinate indicates the angle of view and the axis of abscissa indicates the defocus amount. Further, a solid line curve indicates values on the sagittal image plane of the d line; and a broken line curve indicates values on the meridional image plane of the d line. In the distortional aberration diagrams, the axis of ordinate indicates the angle of view and the axis of abscissa indicates %, and a solid line curve indicates values on the d line. In the comatic aberration diagrams, ω indicates the half angle of view, and a solid line curve indicates values on the d line and a broken line curve indicates values on the g line.

From the aberration diagrams, it can be recognized apparently that the numeral value example 4 has a superior imaging performance in that the aberrations are corrected favorably.

Values of the Conditional Expressions of the Zoom Lens

In the following, values of the conditional expressions of the zoom lens of the present technology.

Values of the conditional expressions (1) to (5) in the zoom lenses 1 to 4 are indicated in Table 13.

TABLE 13

|   |   | Zoom lens 1 | Zoom lens 2 | Zoom lens 3 | Zoom lens 4 |
|---|---|---|---|---|---|
|   | f1 | 51.849 | 52.302 | 45.591 | 64.861 |
|   | fw | 24.733 | 24.738 | 25.804 | 18.550 |
|   | ft | 135.844 | 157.659 | 94.051 | 101.749 |
| Conditional expression (1) | $0.5 < f1/(fw \cdot ft)^{1/2} < 1.8$ | 0.895 | 0.837 | 0.925 | 1.493 |
|   | f3 | 18.364 | 18.062 | 16.420 | 17.992 |
|   | f5 | 143.815 | 181.076 | −92.730 | 92.699 |
| Conditional expression (2) | $-0.4 < f3/f5 < 0.4$ | 0.128 | 0.100 | −0.177 | 0.194 |
| Conditional expression (3) | $0.6 < \beta5 < 1.6$ | 0.814 | 0.847 | 1.315 | 0.809 |
|   | nd51 | 1.5317 | 1.5174 | 1.4875 | 1.4970 |
|   | nd52 | 2.0010 | 2.0010 | 1.9108 | 1.9229 |
| Conditional expression (4) | $nd51 - nd52 < -0.35$ | −0.469 | −0.484 | −0.423 | −0.426 |
|   | vd51 | 48.84 | 52.15 | 70.44 | 81.61 |
|   | vd52 | 29.13 | 29.13 | 35.25 | 20.88 |
| Conditional expression (5) | $vd51 - vd52 > 15$ | 19.706 | 23.016 | 35.191 | 60.727 |

As apparent from Table 13, the zoom lenses 1 to 4 are configured so as to satisfy the conditional expressions (1) to (5).

Configuration of the Image Pickup Apparatus

An image pickup apparatus according to the present technology includes a zoom lens which includes a first lens group, a second lens group, a third lens group, a fourth lens group, and a fifth lens group. The first lens group has a positive refracting power and fixed in a direction of an optical axis. The second lens group has a negative refracting power and movable in the direction of the optical axis to carry out a zooming action. The third lens group has a positive refracting power and fixed in the direction of the optical axis. The fourth lens group has a negative refracting power and movable in the direction of the optical axis to correct a variation of an image forming position and correct a change of the image forming position caused by a change of an object distance. The fifth lens group is fixed in the direction of the optical axis. The first, second, third, fourth and fifth lenses are disposed in order from the object side to the image side. The zoom lens satisfies the following expression (1) and (2):

$$0.5 < f1/(fw \cdot ft)^{1/2} < 1.8 \quad (1)$$

$$-0.4 < f3/f5 < 0.4 \quad (2)$$

where f1 is a focal length of the first lens group; fw a focal length of the entire lens system in a wide angle end state; ft a focal length of the entire lens system in a telephoto end state; f3 a focal length of the third lens group; and f5 a focal length of the fifth lens group.

The conditional expression (1) defines an appropriate magnitude of the focal length of the first lens group with respect to the focal length of the entire lens system.

If the lower limit value of the conditional expression (1) is exceeded downwardly, then the positive refracting power of the first lens group becomes excessively high, and therefore, the spherical aberration in the telephoto end state cannot be cancelled sufficiently.

On the contrary, if the upper limit value of the conditional expression (1) is exceeded upwardly, then the refracting power of the first lens group becomes excessively low, and therefore, the lens comes to have a large size. Further, since also the second lens group and the fourth lens group which move in the direction of the optical axis upon zooming and upon focusing come to have a large size, also the driving mechanism for them comes to have a large size.

The conditional expression (2) defines an appropriate magnitude of the focal length of the third lens group with respect to the focal length of the fifth lens group.

If the lower limit value of the conditional expression (2) is exceeded downwardly, then the negative refracting power of the fifth lens group becomes excessively high. Therefore, the astigmatism and the field curvature cannot be corrected sufficiently.

On the contrary, if the upper limit value of the conditional expression (2) is exceeded upwardly, then the positive refracting power of the third lens group becomes excessively low or the positive refracting power of the fifth lens group becomes excessively high. Consequently, the lenses come to have a large size. Further, since also the second lens group and the fourth lens group which move in the direction of the optical axis upon zooming and upon focusing come to have a large size, also the driving mechanism for them comes to have a large size.

Accordingly, if the zoom lens of the image pickup apparatus satisfies the conditional expressions (1) and (2), then a good image forming performance can be obtained over the overall range of zooming while miniaturization of the zoom lens of the image pickup apparatus is assured.

Further, also the second lens group and the fourth lens group which move in the direction of the optical axis upon zooming and upon focusing can be reduced in size and weight. Therefore, both of high picture quality and quietness upon zooming and upon focusing in image pickup of moving pictures can be facilitated.

It is to be noted that, if the lower limit value and the upper limit value in the conditional expression (1) are set to 0.8 and 1.5, respectively, then the effects described above can be enhanced.

Further, if the lower limit value and the upper limit value of the conditional expression (2) are set to −0.2 and 0.2, respectively, then the effects described above can be enhanced furthermore.

Form of the Image Pickup Apparatus

Figure 17:
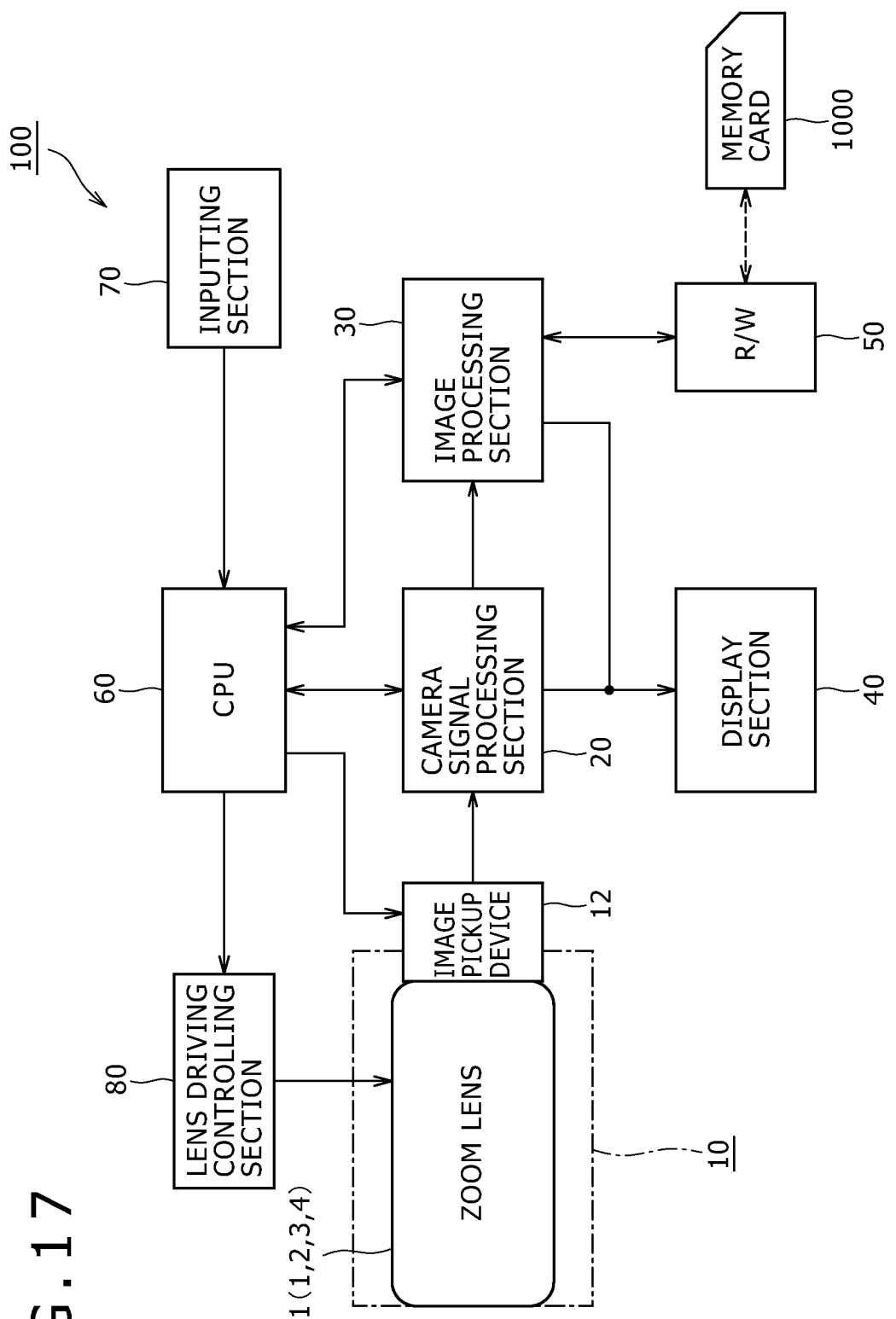
FIG. 17 is a block diagram showing an example of an image pickup apparatus.

FIG. 17 shows a block diagram of a video camera which is a form of the image pickup apparatus of the present technology.

Referring to FIG. 17, an image pickup apparatus 100 in the form of a video camera includes a camera block 10 which takes charge of an image pickup function, and a camera signal processing section 20 for carrying out signal processing of an image signal picked up by the camera block 10 such as analog to digital conversion. The image pickup apparatus 100 further includes an image processing section 30 for carrying out a recording and reproduction process of the image signal. The image pickup apparatus 100 further includes a display section 40 such as an LCD (Liquid Crystal Display) unit for displaying a picked up image and so forth thereon, and a reader/writer (R/W) 50 for carrying out writing and reading out of an image signal into and from a memory card 1000. The image pickup apparatus 100 further includes a CPU (Central Processing Unit) 60 for controlling the entire image pickup apparatus, an inputting section 70 including various switches and so forth for being operated by a user, and a lens driving controlling section 80 for controlling driving of the lens disposed in the camera block 10.

The camera block 10 is configured from an optical system including a zoom lens 11, which may be any of the zoom lenses 1, 2, 3 and 4 to which the present technology is applied, an image pickup device 12 such as a CCD (Charge Coupled Device) unit or a CMOS (Complementary Metal-Oxide Semiconductor) unit, and so forth.

The camera signal processing section 20 carries out various signal processes for an output signal of the image pickup device 12 such as conversion into a digital signal, noise removal, picture quality correction and conversion into luminance and color difference signals.

The image processing section 30 carries out compression coding and decompression decoding processes of an image signal based on a predetermined image data format, a conversion process of data specifications of a resolution and so forth, and other necessary processes.

The display section 40 has a function of displaying thereon an operation state of the inputting section 70 by the user and various data such as a picked up image.

The reader/writer 50 carries out writing of image data encoded by the image processing section 30 into the memory card 1000 and reading out of image data recorded in the memory card 1000.

The CPU 60 functions as a controlling processing section for controlling the circuit blocks provided in the image pickup apparatus 100 and controls the circuit blocks based on an instruction input signal from the inputting section 70 and so forth.

The inputting section 70 is configured, for example, from an image pickup button for carrying out image pickup, a selection switch for selecting an operation mode and other necessary elements. The inputting section 70 outputs an instruction input signal corresponding to an operation by the user to the CPU 60.

The lens driving controlling section 80 controls a motor and other members not shown for driving the lenses of the zoom lens 11 based on a control signal from the CPU 60.

The memory card 1000 is a semiconductor memory which is removably inserted, for example, into a slot connected to the reader/writer 50.

In the following, operation of the image pickup apparatus 100 is described.

In a standby state for image pickup, an image signal picked up by the camera block 10 is outputted to the display section 40 through the camera signal processing section 20 under the control of the CPU 60, and displayed as a camera-through image on the display section 40. On the other hand, if an instruction input signal for zooming is inputted from the inputting section 70, then the CPU 60 outputs a control signal to the lens driving controlling section 80 so that predetermined lenses of the zoom lens 11 are moved under the control of the lens driving controlling section 80.

If the image pickup button not shown of the camera block 10 is operated in response to the instruction input signal from the inputting section 70, then a picked up image signal is outputted from the camera signal processing section 20 to and subjected to a compression coding process by the image processing section 30. By the compression coding process, the image signal is converted into digital data of a predetermined data format. The resulting data is outputted to the reader/writer 50 and written into the memory card 1000.

Focusing is carried out by the lens driving controlling section 80 by moving the predetermined lenses of the zoom lens 11 based on a control signal from the CPU 60.

In order to reproduce image data recorded in the memory card 1000, predetermined image data is read out from the memory card 1000 in response to an operation for the inputting section 70 by the reader/writer 50, and a decompression decoding process is carried out for the image data by the image processing section 30. Then, a reproduction image signal is outputted from the image processing section 30 to the display section 40 so that a reproduction image is displayed on the display section 40.

It is to be noted that, while the embodiment described above is directed to an example wherein the image pickup apparatus is applied to a video camera, the application range of the image pickup apparatus is not limited to the video camera. In particular, the image pickup apparatus can be applied widely as a camera section or the like of a digital inputting and outputting apparatus such as a digital still camera, an interchangeable lens, a portable telephone set in which a camera is incorporated, a PDA (Personal Digital Assistant) in which a camera is incorporated, and like apparatus.

Others

In the zoom lens and the image pickup apparatus of the present technology, a lens which has substantially no refracting power or some other optical element such as an aperture stop may be disposed in addition to the first to fifth lens groups. In this instance, the zoom lens of the present technology has a substantially five-lens configuration including the first to fifth lens groups.

Present Technology

Also it is possible to configure the present technology in the following manner.

<1> A zoom lens, including:

a first lens group having a positive refracting power and fixed in a direction of an optical axis;

a second lens group having a negative refracting power and movable in the direction of the optical axis to carry out a zooming action;

a third lens group having a positive refracting power and fixed in the direction of the optical axis;

a fourth lens group having a negative refracting power and movable in the direction of the optical axis to correct a variation of an image forming position and correct a change of the image forming position caused by a change of an object distance; and a fifth lens group fixed in the direction of the optical axis;

the first, second, third, fourth and fifth lenses being disposed in order from the object side to the image side;

the zoom lens satisfying the following expression (1) and (2):

$$0.5 < f1/(fw \cdot ft)^{1/2} < 1.8 \tag{1}$$

$$-0.4 < f3/f5 < 0.4 \tag{2}$$

where f1 is a focal length of the first lens group; fw a focal length of the entire lens system in a wide angle end state; ft a focal length of the entire lens system in a telephoto end state; f3 a focal length of the third lens group; and f5 a focal length of the fifth lens group.

<2> The zoom lens according <1> above, wherein the zoom lens further satisfies the following expression (3):

$$0.6 < \beta5 < 1.6 \tag{3}$$

where β5 is a lateral magnification of the fifth lens group.

<3> The zoom lens according to <1> or <2> above, wherein an aperture stop is disposed between the second lens group and the third lens group.

<4> The zoom lens according to any of <1> to <3> above, wherein the third lens group is partly movable in a direction substantially perpendicular to the optical axis to allow correction of an image blur.

<5> The zoom lens according to any of <1> to <4>, wherein the fifth lens group includes a positive lens and a negative lens disposed in order from the object side to the image side, and the zoom lens further satisfies the following expressions (4) and (5):

$$nd51 - nd52 < -0.35 \tag{4}$$

$$vd51 - vd52 > 15 \tag{5}$$

where nd51 is a refractive index of the positive lens of the fifth lens group on the d line; nd52 a refractive index of the negative lens of the fifth lens group on the d line; vd51 an Abbe number of the positive lens of the fifth lens group on the d line; and vd52 an Abbe number of the negative lens of the fifth lens group on the d line.

<6> An image pickup apparatus, including:

a zoom lens; and an image pickup device configured to convert an optical image formed by the zoom lens into an electric signal;

the zoom lens including:

a first lens group having a positive refracting power and fixed in a direction of an optical axis;

a second lens group having a negative refracting power and movable in the direction of the optical axis to carry out a zooming action;

a third lens group having a positive refracting power and fixed in the direction of the optical axis;

a fourth lens group having a negative refracting power and movable in the direction of the optical axis to correct a variation of an image forming position and correct a change of the image forming position caused by a change of an object distance; and a fifth lens group fixed in the direction of the optical axis;

the first, second, third, fourth and fifth lenses being disposed in order from the object side to the image side;

the zoom lens satisfying the following expression (1) and (2):

$$0.5 < f1/(fw \cdot ft)^{1/2} < 1.8 \tag{1}$$

$$-0.4 < f3/f5 < 0.4 \tag{2}$$

where f1 is a focal length of the first lens group; fw a focal length of the entire lens system in a wide angle end state; ft a focal length of the entire lens system in a telephoto end state; f3 a focal length of the third lens group; and f5 a focal length of the fifth lens group.

<7> The zoom lens according to any of <1> to <5> above or the image pickup apparatus according to <6>, wherein an optical element including a lens having substantially no lens power is further provided.

The shapes and the numerical values of the components specified in the embodiments described hereinabove are mere examples of embodiments in carrying out the present technology, and the technical scope of the present technology shall not be interpreted restrictively by them.

The present technology contains subject matter related to that disclosed in Japanese Priority Patent Application JP 2012-048159 filed in the Japan Patent Office on Mar. 5, 2012, the entire content of which is hereby incorporated by reference.

What is claimed is:

1. A zoom lens, comprising:
a first lens group having a positive refracting power and fixed in a direction of an optical axis;
a second lens group having a negative refracting power and movable in the direction of the optical axis to carry out a zooming action;
a third lens group having a positive refracting power and fixed in the direction of the optical axis;
a fourth lens group having a negative refracting power and movable in the direction of the optical axis to correct a variation of an image forming position and correct a change of the image forming position caused by a change of an object distance; and
a fifth lens group fixed in the direction of the optical axis; the first, second, third, fourth and fifth lenses being disposed in order from the object side to the image side;
the zoom lens satisfying the following expression (1) and (2)

$$0.5 < f1/(fw \cdot ft)^{1/2} < 1.8 \quad (1)$$

$$-0.4 < f3/f5 < 0.4 \quad (2)$$

where f1 is a focal length of the first lens group; fw a focal length of the entire lens system in a wide angle end state; ft a focal length of the entire lens system in a telephoto end state; f3 a focal length of the third lens group; and f5 a focal length of the fifth lens group.

2. The zoom lens according to claim 1, wherein the zoom lens further satisfies the following expression (3)

$$0.6 < \beta5 < 1.6 \quad (3)$$

where β5 is a lateral magnification of the fifth lens group.

3. The zoom lens according to claim 1, wherein an aperture stop is disposed between the second lens group and the third lens group.

4. The zoom lens according to claim 1, wherein the third lens group is partly movable in a direction substantially perpendicular to the optical axis to allow correction of an image blur.

5. The zoom lens according to claim 1, wherein the fifth lens group includes a positive lens and a negative lens disposed in order from the object side to the image side, and
the zoom lens further satisfies the following expressions (4) and (5)

$$nd51 - nd52 < -0.35 \quad (4)$$

$$vd51 - vd52 > 15 \quad (5)$$

where nd51 is a refractive index of the positive lens of the fifth lens group on the d line; nd52 a refractive index of the negative lens of the fifth lens group on the d line; vd51 an Abbe number of the positive lens of the fifth lens group on the d line; and vd52 an Abbe number of the negative lens of the fifth lens group on the d line.

6. An image pickup apparatus, comprising:
a zoom lens; and
an image pickup device configured to convert an optical image formed by the zoom lens into an electric signal;
the zoom lens including
a first lens group having a positive refracting power and fixed in a direction of an optical axis,
a second lens group having a negative refracting power and movable in the direction of the optical axis to carry out a zooming action,
a third lens group having a positive refracting power and fixed in the direction of the optical axis,
a fourth lens group having a negative refracting power and movable in the direction of the optical axis to correct a variation of an image forming position and correct a change of the image forming position caused by a change of an object distance, and
a fifth lens group fixed in the direction of the optical axis; the first, second, third, fourth and fifth lenses being disposed in order from the object side to the image side;
the zoom lens satisfying the following expression (1) and (2)

$$0.5 < f1/(fw \cdot ft)^{1/2} < 1.8 \quad (1)$$

$$-0.4 < f3/f5 < 0.4 \quad (2)$$

where f1 is a focal length of the first lens group; fw a focal length of the entire lens system in a wide angle end state; ft a focal length of the entire lens system in a telephoto end state; f3 a focal length of the third lens group; and f5 a focal length of the fifth lens group.

* * * * *